(12) United States Patent
Ge et al.

(10) Patent No.: US 11,895,083 B2
(45) Date of Patent: Feb. 6, 2024

(54) ADDRESS OBTAINING METHOD AND AN ADDRESS OBTAINING APPARATUS

(71) Applicant: HUAWEI TECHNOLOGIES CO., LTD., Shenzhen (CN)

(72) Inventors: Cuili Ge, Beijing (CN); Yanmei Yang, Beijing (CN); Hui Ni, Beijing (CN); Yizhuang Wu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/976,248

(22) Filed: Oct. 28, 2022

(65) Prior Publication Data
US 2023/0047849 A1    Feb. 16, 2023

Related U.S. Application Data

(63) Continuation of application No. PCT/CN2021/086286, filed on Apr. 9, 2021.

(30) Foreign Application Priority Data

Apr. 28, 2020 (CN) .......................... 202010348439.9

(51) Int. Cl.
*H04L 61/4535* (2022.01)
*H04L 61/4511* (2022.01)
*H04L 45/02* (2022.01)

(52) U.S. Cl.
CPC .......... *H04L 61/4535* (2022.05); *H04L 45/02* (2013.01); *H04L 61/4511* (2022.05)

(58) Field of Classification Search
CPC ... H04L 61/4535; H04L 45/02; H04L 61/4511
See application file for complete search history.

(56) References Cited

U.S. PATENT DOCUMENTS 11,128,988 B2 * 9/2021 Stammers ............. H04W 4/029
11,765,126 B2 * 9/2023 Roy ..................... H04L 61/4541
                                                                709/245
(Continued)

FOREIGN PATENT DOCUMENTS

CN    106302850 A    1/2017
CN    109981316 A    7/2019
(Continued)

OTHER PUBLICATIONS

Huawei, Hisilicon, EAS discovery based on EES acting as DNS proxy. 3GPP TSG-SA WG6 Meeting #35, Hyderabad, India, Jan. 13-17, 2020, S6-200120, 7 pages.
(Continued)

*Primary Examiner* — Jimmy H Tran
(74) *Attorney, Agent, or Firm* — HAUPTMAN HAM, LLP

(57) ABSTRACT

An address obtaining method includes obtaining, by a third network device, an identifier of a first application from a terminal device. The identifier of the first application indicates a request for obtaining an address of an instance of the first application. The address obtaining method further includes sending, by the third network device, a first message to a first network device, wherein the first message comprises the identifier of the first application, and the first message is useable to request the address of the instance of the first application. The address obtaining method further includes receiving, by the third network device, the address of the instance of the first application from the first network device, and sending the address of the instance of the first application to the terminal device.

20 Claims, 9 Drawing Sheets

(56) References Cited

U.S. PATENT DOCUMENTS

| | | | |
|---|---|---|---|
| 2010/0039958 A1* | 2/2010 | Ge | H04L 12/2803 |
| | | | 370/254 |
| 2012/0144457 A1 | 6/2012 | Counterman | |
| 2019/0320324 A1* | 10/2019 | Guan | H04L 41/145 |
| 2020/0112848 A1* | 4/2020 | Palaniappan | H04W 76/16 |
| 2020/0120446 A1 | 4/2020 | Stammers et al. | |
| 2021/0058784 A1* | 2/2021 | Kedalagudde | H04W 48/18 |
| 2021/0075892 A1* | 3/2021 | Chun | H04L 69/163 |
| 2021/0111953 A1* | 4/2021 | Hall | H04L 41/12 |
| 2021/0243264 A1* | 8/2021 | Yoon | H04L 67/51 |
| 2021/0307018 A1* | 9/2021 | Qaisrani | H04W 24/02 |
| 2021/0352156 A1* | 11/2021 | Kim | H04W 84/00 |
| 2021/0409468 A1* | 12/2021 | Griffiths | H04L 65/611 |
| 2022/0030064 A1* | 1/2022 | Dreyband | H04L 67/51 |
| 2022/0052961 A1* | 2/2022 | Chauhan | H04L 47/783 |
| 2022/0174033 A1* | 6/2022 | Ke | H04L 61/5038 |
| 2022/0182358 A1* | 6/2022 | Xiong | H04L 61/2517 |
| 2022/0191090 A1* | 6/2022 | Lee | H04L 67/04 |
| 2022/0191650 A1* | 6/2022 | Kim | H04L 67/52 |
| 2022/0191776 A1* | 6/2022 | Kim | H04W 12/06 |
| 2022/0232066 A1* | 7/2022 | Subramaniam | H04L 41/046 |
| 2022/0240087 A1* | 7/2022 | Balmakhtar | H04W 12/08 |
| 2022/0263788 A1* | 8/2022 | Lee | H04L 61/4511 |
| 2022/0321418 A1* | 10/2022 | Xu | H04L 41/0806 |
| 2022/0322067 A1* | 10/2022 | Kim | H04W 12/72 |
| 2022/0330128 A1* | 10/2022 | Kim | H04W 36/0011 |
| 2022/0345442 A1* | 10/2022 | Lee | H04L 61/4511 |
| 2022/0377046 A1* | 11/2022 | Zhang | H04L 67/51 |
| 2022/0394088 A1* | 12/2022 | Salkintzis | H04L 67/1036 |
| 2023/0013720 A1* | 1/2023 | Gupta | H04W 12/08 |
| 2023/0026671 A1* | 1/2023 | Seed | H04W 36/32 |
| 2023/0047503 A1* | 2/2023 | Kim | H04L 67/51 |
| 2023/0062452 A1* | 3/2023 | Kim | H04W 48/18 |
| 2023/0079974 A1* | 3/2023 | Xiong | H04L 61/4511 |
| | | | 709/245 |
| 2023/0106757 A1* | 4/2023 | Tang | H04W 40/34 |
| | | | 370/252 |
| 2023/0108959 A1* | 4/2023 | Kim | H04W 8/00 |
| | | | 370/329 |
| 2023/0171153 A1* | 6/2023 | Aharon | H04L 41/0813 |
| | | | 709/223 |
| 2023/0180117 A1* | 6/2023 | Lee | H04L 65/1073 |
| | | | 370/329 |
| 2023/0199468 A1* | 6/2023 | Lv | H04W 8/02 |
| | | | 455/435.1 |
| 2023/0199480 A1* | 6/2023 | Tao | H04W 4/021 |
| | | | 370/338 |
| 2023/0217360 A1* | 7/2023 | Karampatsis | H04W 24/10 |
| | | | 370/329 |
| 2023/0239215 A1* | 7/2023 | Kim | H04L 67/02 |
| | | | 709/223 |
| 2023/0254202 A1* | 8/2023 | Lee | H04L 41/5058 |
| | | | 709/223 |
| 2023/0284007 A1* | 9/2023 | Zhang | H04W 8/06 |
| | | | 455/435.1 |
| 2023/0284129 A1* | 9/2023 | Zaus | H04L 41/18 |
| | | | 455/435.2 |
| 2023/0300104 A1* | 9/2023 | Thiebaut | H04L 61/255 |
| | | | 709/206 |
| 2023/0300107 A1* | 9/2023 | Kim | H04L 61/58 |
| | | | 370/390 |
| 2023/0300726 A1* | 9/2023 | Zhang | H04W 48/16 |
| | | | 709/203 |
| 2023/0308927 A1* | 9/2023 | Lee | H04W 24/10 |
| | | | 370/329 |
| 2023/0308951 A1* | 9/2023 | Zhang | H04W 28/14 |
| | | | 370/230 |

FOREIGN PATENT DOCUMENTS

| | | |
|---|---|---|
| CN | 110324246 A | 10/2019 |
| CN | 110661753 A | 1/2020 |
| WO | 2013075746 A1 | 5/2013 |
| WO | 2014036970 A1 | 3/2014 |
| WO | 2016130140 A1 | 8/2016 |
| WO | 2018188423 A1 | 10/2018 |
| WO | 2019129112 A1 | 7/2019 |
| WO | 2019147970 A1 | 8/2019 |
| WO | 2019165665 A1 | 9/2019 |
| WO | 2020057328 A1 | 3/2020 |

OTHER PUBLICATIONS

Convida Wireless LLC, Samsung, EEC Registration based on TR solution 8. 3GPP TSG-SA WG6 Meeting #35, Hyderabad, India, Jan. 13-17, 2020, S6-200239, 5 pages.

3GPP TS 23.501 V16.4.0 (Mar. 2020), 3rd Generation Partnership Project; Technical Specification Group Services and System Aspects; System architecture for the 5G System (5GS); Stage 2(Release 16), 430 pages.

Samsung, Ericsson, EAS discovery using DNS. 3GPP TSG-SA WG6 Meeting #34, Reno, Nevada, US Nov. 11-15, 2019, S6-192361, 3 pages.

International Search Report issued in corresponding International Application No. PCT/CN2021/086286, dated Jun. 30, 2021, pp. 1-11.

Chinese Office Action issued in corresponding Chinese Application No. 202010348439.9, dated Jan. 3, 2023, pp. 1-16.

India Office Action issued in corresponding India Application No. 202227062608, dated Jan. 11, 2023.

Ericsson, S2-2000196 Edge Application ServerDiscovery and selectionusing DNS, Jan. 13-17, 2020, Incheon, Korea, total 4 pages.

Jiang Yan et al:"Optimized hand-over scheme based on SIP for stratospheric telecommunication platform",Feb. 15, 2008, total 5 pages.

CATT: "Solution for KI #1: Discovery of Edge Application Server", 3GPP Draft; S2-2000685, Jan. 7, 2020, XP051842740, total 4 pages.

Extended European Search Report issued in corresponding European Application No. 21796367.7, dated Aug. 21, 2023, pp. 1-8.

\* cited by examiner

ADDRESS OBTAINING METHOD AND AN ADDRESS OBTAINING APPARATUS

CROSS-REFERENCE TO RELATED APPLICATIONS

This application is a continuation of International Application No. PCT/CN2021/086286, filed on Apr. 9, 2021, which claims priority to Chinese Patent Application No. 202010348439.9, filed on Apr. 28, 2020, the disclosures of the aforementioned applications are hereby incorporated by reference in their entireties.

TECHNICAL FIELD

This application relates to the field of communication technologies, and in particular, to an address obtaining method and an apparatus.

BACKGROUND

To better provide a service for a user, a same application server instance is usually deployed in a plurality of edge data networks (EDNs) at the same time, and the same application server instance in the plurality of edge data networks may provide a same service. Currently, after a terminal device accesses a network, if an application client installed on the terminal device requires a service, to obtain an address of an application server instance corresponding to the application client, the terminal device may subscribe to the address of the application server instance from an edge enabler server (EES) in a subscription or discovery manner.

However, in this method, the terminal device is first required to support a new protocol with the EES for subscription to the address of the application server instance from the EES. Therefore, in addition to subscription to the address of the application server instance from the EES, how to obtain the address of the application server instance is an urgent problem to be resolved.

SUMMARY

One or more embodiments of the present application provide an address obtaining method and an apparatus, to resolve a problem of how to provide an address of an application server instance for a terminal device.

According to a first aspect, this application provides an address obtaining method. The method includes: A first network device obtains registration information. Because the registration information may indicate that a second network device can provide an address of an instance of at least one application, when the first network device receives, from a third network device, a first message including an identifier of a first application, and the first message is used to request an address of an instance of the first application, the first network device may send a second message to the second network device when determining, based on the registration information and the identifier of the first application, that the second network device can provide the address of the instance of the first application. The second message includes the identifier of the first application, and the second message is used to request the address of the instance of the first application. Further, when receiving the address of the instance of the first application from the second network device, the first network device may send the address of the instance of the first application to the third network device, so as to send the address of the instance of the first application to a terminal device via the third network device.

According to the foregoing method, by obtaining the registration information of the second network device, when receiving a request that is sent by the terminal via the third network device and that is on an address of an instance of an application, the first network device can select, for the terminal based on the registration information, an address of an instance that is of the application and that corresponds to an optimal network communication path, thereby improving accuracy by selecting the instance that is of the application and that is close to a location of the terminal.

In some embodiments, the first message may be an EAS discovery request message, or may be a message of another type.

An application layer protocol interface is supported, to help convert a DNS message into an EAS discovery request message. This can avoid using an ECS extension option of the DNS message, so that more parameters than those in the DNS message can be further carried for selecting an instance of an application, thereby further improving accuracy of selecting an application server instance and reducing complexity of system implementation.

In some embodiments, that a first network device obtains registration information includes: The first network device may receive the registration information from the second network device, or the first network device may obtain the registration information that is preconfigured in the first network device.

Based on the registered or preconfigured registration information, the first network device may determine addresses that are of instances and that can be provided by the second network device, so that an application server instance request of the terminal device can be sent to a second network device that is relatively close to a location of the terminal device, thereby improving accuracy of selecting an instance of an application of the terminal device.

In some embodiments, the first network device may further send the registration information to the third network device, or the first network device may further send indication information to the third network device, where the indication information indicates that the first network device can provide an address of an instance of at least one application, and the indication information is determined based on the registration information.

The registration information or the indication information is sent to the third network device, so that the third network device can select an optimized second network device or first network device to process an application server instance query request of the terminal device, thereby improving accuracy of selecting an instance of an application of the terminal device.

In some embodiments, the first network device is an edge enabler server EES, the second network device is a local DNS server, and the third network device is a session management function SMF network element, an NEF network element, or an edge configuration server ECS; or the first network device is an ECS, the second network device is a local DNS server, and the third network device is an SMF network element or an NEF network element.

In some embodiments, the method further includes: The first network device may determine, based on at least one of the registration information and the identifier of the first application, that the second network device can provide the address of the instance of the first application.

The first network device selects, based on at least one of the registration information of the second network device and the identifier of the first application, an appropriate second network device to process and provide the address that is of the instance of the application and that is requested by the terminal device, so that accuracy of selecting an instance of an application of the terminal device can be improved.

In some embodiments, the registration information includes area information corresponding to the second network device. In this case, the first network device may further obtain location information of a terminal device, so as to determine, based on the area information in the registration information and the location information of the terminal device, that the second network device can provide the address of the instance of the first application.

The first network device selects, based on the area information of the second network device and the location information of the terminal device, an appropriate second network device to process and provide the address that is of the instance of the application and that is requested by the terminal device, so that accuracy of selecting an instance of an application of the terminal device can be improved.

According to a second aspect, this application further provides a communication apparatus. The communication apparatus has a function of implementing any method provided in the first aspect. The communication apparatus may be implemented by hardware, or may be implemented by executing corresponding software by hardware. The hardware or the software includes one or more units corresponding to the foregoing function.

In some embodiments, the communication apparatus includes a processor, and the processor is configured to support the communication apparatus in performing a corresponding function of the first network device in the foregoing method. The communication apparatus may further include a memory. The memory may be coupled to the processor, and the memory stores program instructions and data that are necessary for the communication apparatus. In some embodiments, the communication apparatus further includes a communication interface. The communication interface is configured to support communication between the communication apparatus and a device such as a third network device.

In some embodiments, the communication apparatus includes corresponding functional units, respectively configured to implement the steps in the foregoing method. The function may be implemented by hardware, or may be implemented by executing corresponding software by hardware. The hardware or the software includes one or more units corresponding to the foregoing function.

In some embodiments, a structure of the communication apparatus includes a processing unit and a communication unit. These units may perform corresponding functions in the foregoing method examples. For details, refer to the descriptions in the method according to the first aspect. Details are not described herein again.

According to a third aspect, this application further provides an address obtaining method, including: A third network device obtains an identifier of a first application from a terminal device, where the identifier of the first application indicates a request for obtaining an address of an instance of the first application. The third network device sends a first message to a first network device, where the first message includes the identifier of the first application, and the first message is used to request the address of the instance of the first application. The third network device receives the address of the instance of the first application from the first network device, and sends the address of the instance of the first application to the terminal device.

In some embodiments, the method further includes: The third network device receives registration information sent by the first network device, where the registration information indicates that a second network device can provide an address of an instance of at least one application. Alternatively, the third network device receives indication information from the first network device, where the indication information indicates that the first network device can provide an address of an instance of at least one application, and the indication information is determined based on the registration information.

In some embodiments, the method further includes: The third network device determines, based on the registration information or the indication information, that the first network device can provide the address of the instance of the first application; and/or the third network device determines, based on the registration information, that the second network device can provide the address of the instance of the first application.

In some embodiments, the first message is an edge application server EAS discovery request message.

In some embodiments, that a third network device obtains an identifier of a first application from a terminal device includes: The third network device obtains a DNS query request from the terminal device, where the DNS query request includes the identifier of the first application, and the DNS query request is used to request the address of the instance of the first application.

In some embodiments, the first network device is an edge enabler server EES, and the third network device is a session management function SMF network element, an NEF network element, or an edge configuration server ECS; or the first network device is an ECS, and the third network device is an SMF network element or an NEF network element.

According to a fourth aspect, this application further provides a communication apparatus. The communication apparatus has a function of implementing any method provided in the third aspect. The communication apparatus may be implemented by hardware, or may be implemented by executing corresponding software by hardware. The hardware or the software includes one or more units corresponding to the foregoing function.

In some embodiments, the communication apparatus includes a processor, and the processor is configured to support the communication apparatus in performing a corresponding function of the third network device in the foregoing method. The communication apparatus may further include a memory. The memory may be coupled to the processor, and the memory stores program instructions and data that are necessary for the communication apparatus. In some embodiments, the communication apparatus further includes a communication interface. The communication interface is configured to support communication between the communication apparatus and a device such as a first network device.

In some embodiments, the communication apparatus includes corresponding functional units, respectively configured to implement the steps in the foregoing method. The function may be implemented by hardware, or may be implemented by executing corresponding software by hardware. The hardware or the software includes one or more units corresponding to the foregoing function.

In some embodiments, a structure of the communication apparatus includes a processing unit and a communication unit. These units may perform corresponding functions in the foregoing method examples. For details, refer to the descriptions in the method according to the third aspect. Details are not described herein again.

According to a fifth aspect, this application provides a communication apparatus. The communication apparatus includes a processor. When the processor executes a computer program or instructions in a memory, the method according to the first aspect is performed.

According to a sixth aspect, this application provides a communication apparatus. The communication apparatus includes a processor. When the processor executes a computer program or instructions in a memory, the method according to the third aspect is performed.

According to a seventh aspect, this application provides a communication apparatus. The communication apparatus includes a processor and a memory. The memory is configured to store a computer program or instructions, and the processor is configured to execute the computer program or the instructions stored in the memory, to enable the communication apparatus to perform the corresponding method according to the first aspect.

According to an eighth aspect, this application provides a communication apparatus. The communication apparatus includes a processor and a memory. The memory is configured to store a computer program or instructions, and the processor is configured to execute the computer program or the instructions stored in the memory, to enable the communication apparatus to perform the corresponding method according to the third aspect.

According to a ninth aspect, an embodiment of this application provides a communication apparatus. The communication apparatus includes a processor, a memory, and a transceiver. The transceiver is configured to: receive or send a signal. The memory is configured to store a computer program or instructions. The processor is configured to invoke the computer program or the instructions from the memory to perform the method according to the first aspect.

According to a tenth aspect, an embodiment of this application provides a communication apparatus. The communication apparatus includes a processor, a memory, and a transceiver. The transceiver is configured to: receive or send a signal. The memory is configured to store a computer program or instructions. The processor is configured to invoke the computer program or the instructions from the memory to perform the method according to the third aspect.

According to an eleventh aspect, this application provides a communication apparatus. The communication apparatus includes a processor and an interface circuit. The interface circuit is configured to receive code instructions and transmit the code instructions to the processor, and the processor runs the code instructions to perform the corresponding method according to the first aspect.

According to a twelfth aspect, this application provides a communication apparatus. The communication apparatus includes a processor and an interface circuit. The interface circuit is configured to receive code instructions and transmit the code instructions to the processor, and the processor runs the code instructions to perform the corresponding method according to the third aspect.

According to a thirteenth aspect, this application provides a computer-readable storage medium. The computer-readable storage medium is configured to store a computer program or instructions. When a computer reads and executes the computer program or the instructions, the method according to the first aspect is implemented.

According to a fourteenth aspect, this application provides a computer-readable storage medium. The computer-readable storage medium is configured to store a computer program or instructions. When a computer reads and executes the computer program or the instructions, the method according to the third aspect is implemented.

According to a fifteenth aspect, this application provides a computer program product including instructions. When a computer reads and executes the computer program product, the method according to the first aspect is implemented.

According to a sixteenth aspect, this application provides a computer program product including instructions. When a computer reads and executes the computer program product, the method according to the third aspect is implemented.

According to a seventeenth aspect, this application provides a chip, including a processor. The processor is coupled to a memory, and is configured to execute a computer program or instructions stored in the memory. When the processor executes the computer program or the instructions, the method according to the first aspect is implemented.

According to an eighteenth aspect, this application provides a chip, including a processor. The processor is coupled to a memory, and is configured to execute a computer program or instructions stored in the memory. When the processor executes the computer program or the instructions, the method according to the third aspect is implemented.

According to a nineteenth aspect, this application provides a system, including the apparatus provided in the second aspect and the apparatus provided in the fourth aspect.

DESCRIPTION OF EMBODIMENTS

The following describes embodiments of this application in detail with reference to the accompanying drawings of this specification.

The communication method provided in embodiments of this application may be applied to a 4th generation (4G) communication system, a 5th generation (5G) communication system, or various future communication systems. Specifically, embodiments of this application may be applied to a communication system that supports an edge (edge) application architecture formulated by the 3rd Generation Partnership Project (3GPP). The edge application architecture may be shown in FIG. 1.

Figure 1:
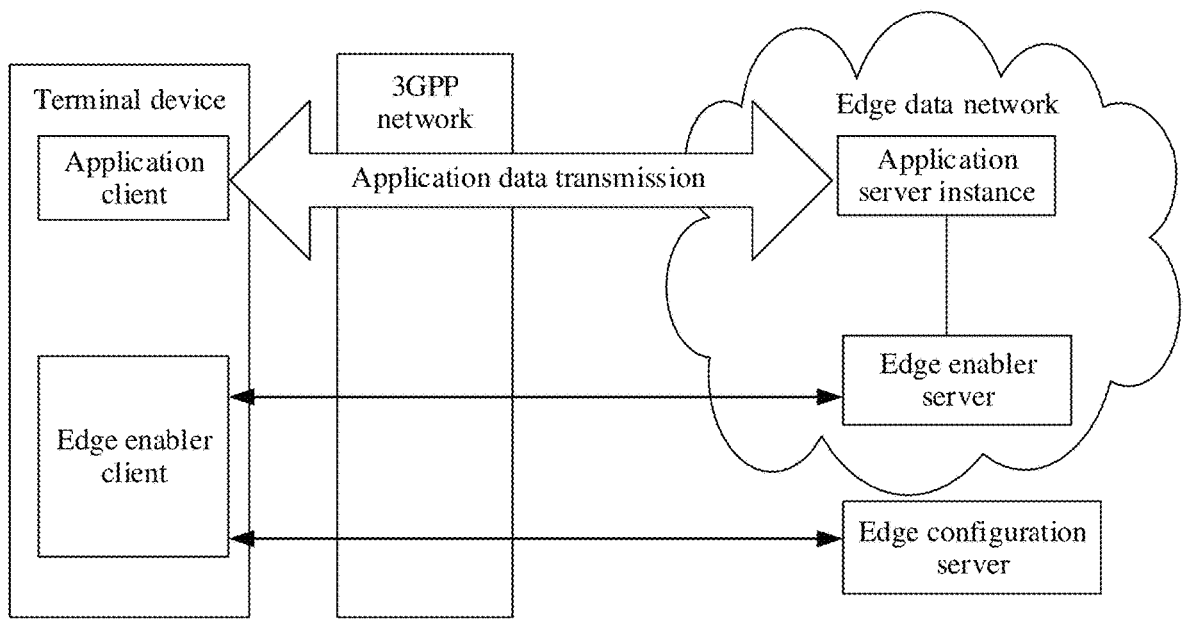
FIG. 1 is a schematic diagram of a network architecture to which an embodiment of this application is applicable.

In the architecture shown in FIG. 1, in some embodiments, an edge data network (EDN) may correspond to a data network (DN), is a special local data network (DN), includes an edge enabler function, may be identified by using a data network access identifier (DNAI) and a data network name (DNN), and is a network logical concept. In some embodiments, the EDN is an equivalent concept of a center cloud, and may be understood as a local data center (a geographical location concept). The EDN may be identified by using a DNAI, and may include a plurality of local data networks (local DNs).

An application server instance (application server instance) may be deployed in the EDN. The application server instance may also be referred to as an edge application, an edge application server instance, a multi-access edge computing (MEC) application (server), an edge application server (EAS) function, or the like. In embodiments of this application, the application server instance may be referred to as an instance (instance) for short. The application server instance is a server function of an application (application) deployed in the EDN. The application may include but is not limited to a social media software application, an augmented reality (AR) application, a virtual reality (VR) application, a game application, a smart factory application, an internet of vehicles application, a drone application, and the like. An application can be deployed in one or more EDNs, and a plurality of instances of an application can be deployed in an identical EDN. Each instance is referred to as an EAS. Different EASs may share one domain name and use one anycast internet protocol (anycast IP) address, or may use different domain names or IP addresses. Different EASs can have independent identifiers, such as instance identifiers. Different applications are distinguished based on different identifiers, and the identifier of the application may be a fully qualified domain name (FQDN).

A peer entity of the edge application on a terminal device side is an application client (application client). The application client is used by an application user (user) to obtain an application service from an application server. The application client is a client program of the application on the terminal device side. The application client may be connected to an application server (AS) deployed on a cloud to obtain the application service, or may be connected to an EAS deployed on one or more EDNs to obtain the application service.

An edge enabler server (EES) may provide some edge enabler capabilities for an application server instance deployed in an EDN, to better support deployment of an application in MEC. The EES can support registration of an edge application, support authentication and authorization of a terminal device, and provide an address of an application server instance for the terminal device. The EES can further obtain an identifier and address information of the application server instance, and can further send the identifier and the address information of the application server instance to an edge data network configuration server. The EES is deployed in the EDN. Generally, an EAS is registered to an EES, or information about the EAS is configured on the EES via a management system, and the EES is referred to as an EES associated with the EAS. This may also be understood as that the EES controls (or manages) the EAS that is registered to (or configured on) the EES.

An edge enabler client (EEC) is a peer entity of an EES on a terminal device side. The EEC is configured to: register information about the EEC and information about an application client to the EES, perform security authentication and authorization, obtain an EAS IP address from the EES, and provide an edge computing enabler capability for the application client. For example, the EEC uses an EAS discovery service to return an EAS address to the application client.

An edge configuration server (ECS) may also be referred to as an edge data network configuration server, is responsible for configuring an EDN and an EES, for example, providing information about the EES for a terminal device. The ECS may further directly provide information about an application server instance for the terminal device, and interact with a DNS of an application to obtain the information about the application server instance. Further, the ECS obtains the information about the application server instance and information about an IP address from another functional entity and stores the information. In a current standard, functions of the ECS are integrated into those of an EEC entity. In other words, the EEC has functions of the EEC and the ECS.

Figure 2:
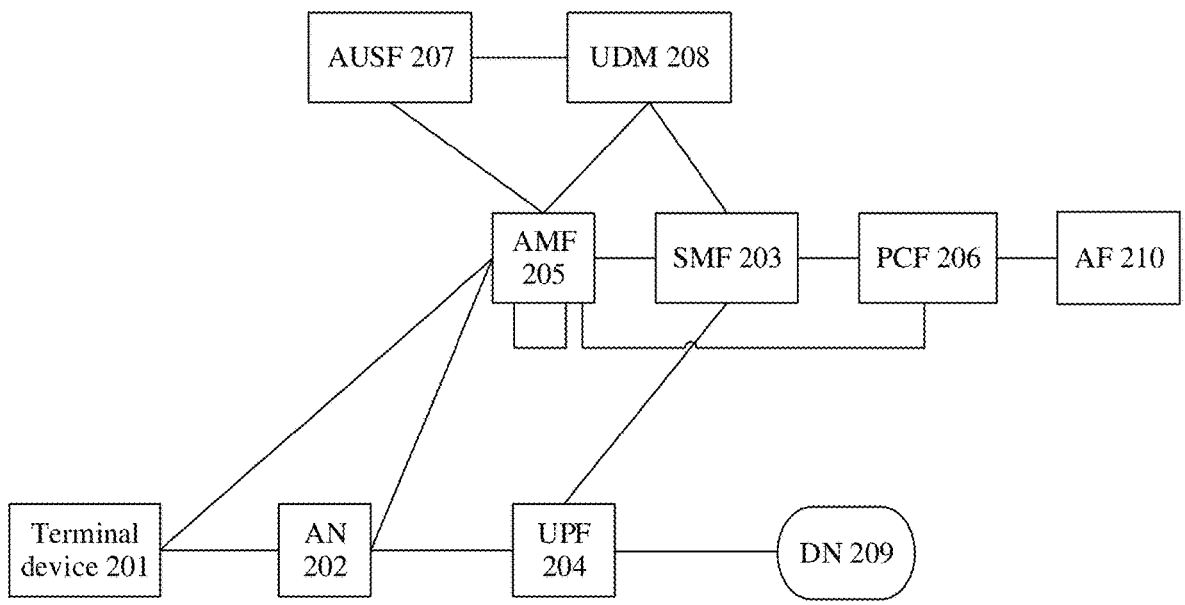
FIG. 2 is a schematic diagram of a 5G architecture to which an embodiment of this application is applicable.

The architecture shown in FIG. 1 may be applied to a 5G network. Specifically, FIG. 2 is an example of a schematic diagram of a 5G network architecture applicable to an embodiment of this application. As shown in FIG. 2, in the 5G network architecture, a terminal device 201 may communicate with a core network via an access network (AN) 202. The terminal device may be user equipment (UE), an access terminal, a subscriber unit, a subscriber station, a mobile station, a remote station, a remote terminal, a mobile device, a user terminal, a terminal, a wireless communication device, a user agent, or a user apparatus. The access terminal may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a future 5G network, or the like. For ease of description, FIG. 2 shows only one terminal as an example. In an actual network, a plurality of terminals may coexist, and details are not described herein.

The AN may also be referred to as a radio access network (RAN), and the AN and the RAN are collectively referred to as an AN below. The AN is mainly responsible for providing a wireless connection for the terminal device 201, ensuring reliable transmission of uplink and downlink data of the terminal device 201, and the like. The access network 202 may be a generation NodeB (gNB) in a 5G system, may be an evolved NodeB (eNB or eNodeB) in a long term evolution (LTE) system, or the like.

A session management function (SMF) 203 is mainly responsible for establishing a session, managing a session, and the like for the terminal device 201. An appropriate UPF may be selected for the terminal device 201 based on location information of the terminal device 201.

A user plane function (UPF) 204 is a user plane function network element of the terminal device 201, and main functions include packet routing and forwarding, quality of service (QoS) processing of user plane data, and the like. In the 5G system, a plurality of session anchor UPFs may be inserted into a user plane path of one protocol data unit (PDU) session, to support a connection to a local data network (DN), so that a terminal device can access an application in the local DN nearby. Specifically, a plurality of UPFs may be included between the terminal device and the DN. Some UPFs may be used as uplink classifiers (ULCLs) or branching points (BPs), and some UPFs may be used as PDU session anchors (PSAs).

Main functions of an access and mobility management function (AMF) 205 include being served as a termination point of a radio access network control plane, being served as a termination point of non-access signaling, mobility management, lawful interception, access authorization or authentication, and the like.

A policy control function (PCF) 206 is mainly responsible for functions such as establishment, release, and modification of a user plane transmission path.

Main functions of an authentication server function (AUSF) 207 include user authentication and the like.

A user data management (UDM) 208 is mainly responsible for managing subscription data of a user.

A data network (DN) 209 may be a network that provides a service for the terminal device 201.

An application server (AS) 210 may provide a data service for an application (application) in the terminal device.

FIG. 2 further shows possible embodiments of interfaces in the entities, for example, an N2 interface between the AN 202 and the AMF 209, and an N9 interface between the AN 202 and the UPF 204. Details are not described herein.

A network architecture and a service scenario described in embodiments of this application are intended to describe the technical solutions in embodiments of this application more clearly, and do not constitute a limitation on the technical solutions provided in embodiments of this application. A person of ordinary skill in the art may know that: With the evolution of the network architecture and the emergence of new service scenarios, the technical solutions provided in embodiments of this application are also applicable to a similar technical problem.

In embodiments of this application, an NR network scenario in a wireless communication network is used as an example to describe some scenarios. It should be noted that the solutions in embodiments of this application may further be applied to another wireless communication network, and a corresponding name may also be replaced with a name of a corresponding function in the another wireless communication network.

Figure 3:
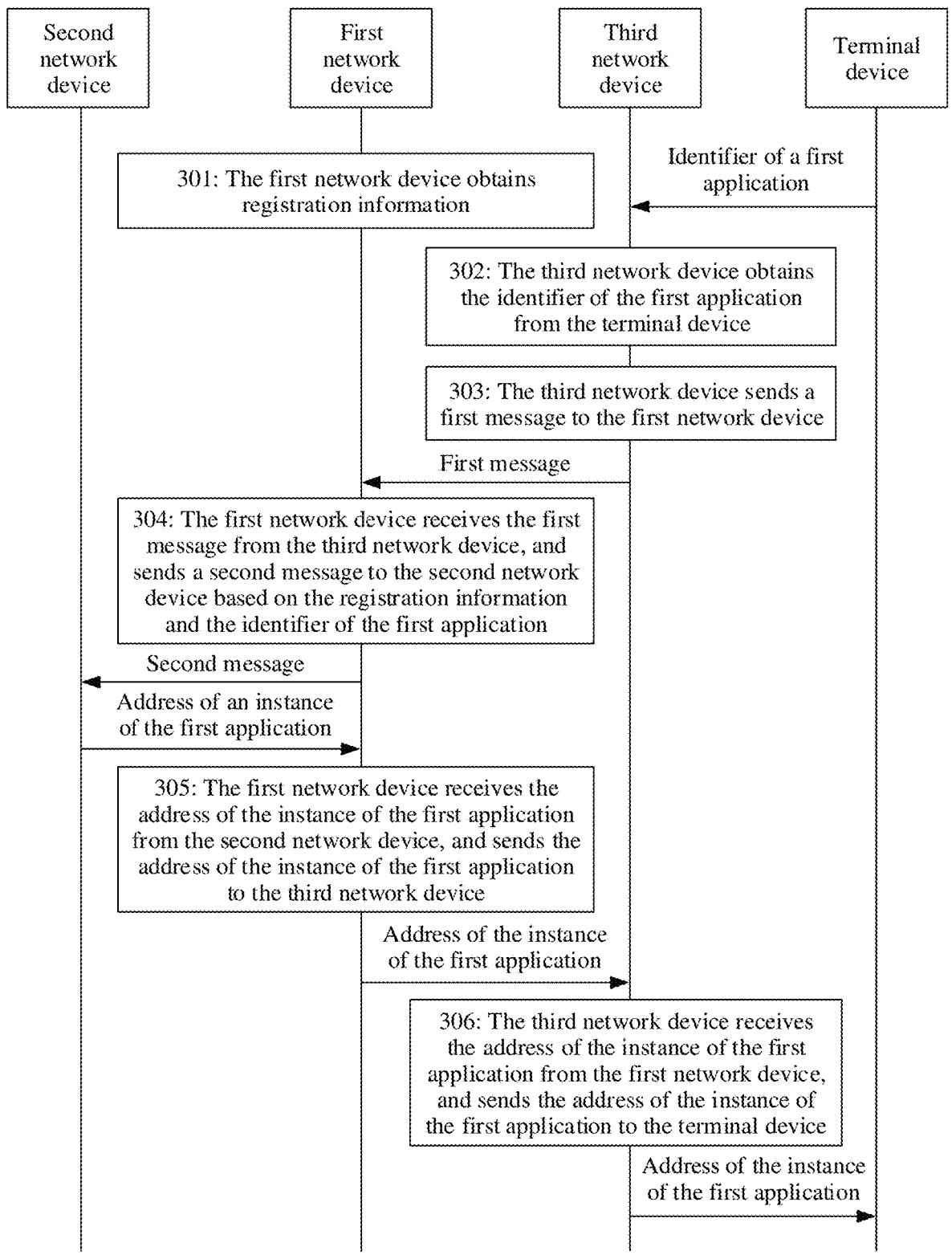
FIG. 3 is a schematic flowchart of an address obtaining method according to an embodiment of this application.

FIG. 3 is a schematic flowchart of an address obtaining method according to an embodiment of this application. In the procedure shown in FIG. 3, in some embodiments, a first network device may be an EES, a second network device may be a local domain name system (DNS) server, and a third network device may be an SMF network element, an NEF network element, or an ECS. In some embodiments, the first network device may be an ECS, the second network device may be a local DNS server or a centralized DNS server, and the third network device may be an SMF network element or an NEF network element. Specifically, refer to FIG. 3. The method includes the following steps.

Step 301: The first network device obtains registration information.

The registration information indicates that the second network device can provide an address of an instance of at least one application.

In some embodiments, the first network device may receive the registration information from the second network device. In these some embodiments, the second network device includes a correspondence between identifiers of a plurality of applications and addresses of instances of the plurality of applications. The second network device may indicate, via the registration information, the correspondence of the addresses of the instances of the plurality of applications to the first network device, so that the first network device can determine, based on first indication information, the addresses that are of the instances of the applications and that can be provided by the second network device.

The registration information may include an identifier of the at least one application, and may further include information about the second network device. The information about the second network device may include an identifier, a device address, a device type, a device vendor name, and the like of the second network device. The identifier of the second network device may be an FQDN, a character combination, a digit combination, or a URL. The address of the second network device may be an IP address, an IP address and a port number, an IP address prefix, a URL, or another address form that may be used to address the second network device. The type of the second network device indicates a type of the second network device, and is generally distinguished based on functions. For example, the second network device may be a local DNS server (which is also referred to as an edge DNS server) or a centralized DNS server. The device vendor name may be a name of a vendor that provides the device. The identifier of the application may be an FQDN, or another character combination for identifying the application. In addition, the identifier of the application may further include an identifier of a client of the application. For example, the FQDN of the application may be app1.com, and the identifier of the application client of the application may be APP1 or IOS.APP1.

In some embodiments, the second network device may not send the registration information to the first network device, and the registration information is preconfigured in the first network device instead. For example, the registration information is configured in the first network device by an administrator during deployment of the first network device.

Alternatively, the registration information may be configured in the first network device by another network device other than the second network device. For example, an edge computing service provider, a mobile communication operator, or an application provider may configure the registration information in the first network device in advance.

In some embodiments, the second network device may be a centralized DNS server, and the centralized DNS server includes a correspondence between an identifier of an application and an address of an instance of the application.

It should be noted that the first network device may further obtain registration information sent by another second network device. The registration information sent by the second network device may indicate that the second network device that sends the registration information can provide an address of an instance of at least one application. Registration information that is sent by all second network devices and that is obtained by the first network device has a same function, and addresses that are of instances of applications and that can be provided by different second network devices may be the same, may be different, or may be partially the same.

Further, after obtaining the registration information, the first network device may send the registration information to the third network device. Alternatively, the first network device may send indication information to the third network device, where the indication information indicates that the first network device can provide an address of an instance of at least one application. The indication information may be determined based on the registration information. For example, the indication information may be obtained by aggregating corresponding registration information that is sent by at least one second network device and that is obtained by the first network device. For example, a second network device 1 may provide addresses of instances of applications {A, B, C}, and a second network device may provide addresses of instances of {A, B, D}. In this case, the indication information may indicate that the first network device may provide addresses of instances of {A, B, C, D}. To be specific, the applications corresponding to the addresses that are of the instances of the applications and that the first network device can provide as indicated in the indication information are a union set of the applications corresponding to the addresses that are of the instances of the applications and that can be provided by the second network device as indicated in the registration information corresponding to the at least one second network device. In some embodiments, content included in the indication information may be content included in the registration information and information about the first network device, that is, the indication information may include the registration information and the information about the first network device. When there are a plurality of second network devices, the indication information may include registration information corresponding to all the second network devices and the information about the first network device. In some embodiments, the indication information is generated based on the registration information. For example, the indication information may include an identifier of at least one application and information about the first network device. In this case, the identifier of the at least one application in the indication information is a union set of application identifiers in registration information corresponding to all second network devices.

For example, the first network device obtains registration information corresponding to the second network device 1 and second registration information corresponding to the second network device 2. The registration information corresponding to the second network device 1 is {application A identifier, application B identifier, application C identifier, information about the second network device 1}. The second registration information corresponding to the second network device 2 is {application A identifier, application B identifier, application D identifier, information about the second network device 2}. In this case, the indication information may be {{application A identifier, application B identifier, application C identifier, information about the second network device 1}, {application A identifier, application B identifier, application D identifier, information about the second network device 2}, information about the first network device}, or {application A identifier, application B identifier, application C identifier, application D identifier, information about the first network device}. The information about the first network device may include an identifier, a device address, a device type, a device vendor name, and the like of the first network device. The identifier of the first network device may be an FQDN, a character combination, a digit combination, or a URL. The address of the first network device may be an IP address, an IP address and a port number, an IP address prefix, a URL, or another address form that may be used to address the first network device. The type of the first network device indicates a type of the first network device, and is generally distinguished based on functions. For example, the first network device may be an EES or an ECS. The device vendor name may be a name of a vendor that provides the device.

Further, after obtaining the registration information or the indication information, the third network device sends an application instance address request message to the second network device, to request instance addresses of one or more applications, and the one or more applications are applications whose instance addresses can be provided by the second network device.

Step 302: The third network device obtains an identifier of a first application from a terminal device.

How the third network device obtains the identifier of the first application is not limited in embodiments of this application. For example, the terminal device may send a DNS query request including the identifier of the first application, and the third network device may obtain the identifier of the first application based on the DNS query request. The DNS query request may be used by the terminal device to request to obtain an address of an instance of the first application.

The identifier of the first application may be an FQDN, and the identifier of the first application may further include an identifier of a client of the application. For example, the FQDN of the application may be app1.com, and the identifier of the application client of the application may be APP1 or IOS.APP1. The address of the instance of the first application includes but is not limited to an IP address of the instance, an IP address and a port number, an IP address prefix, a URL, or other information that can be used to address the address of the instance of the first application. The terminal device may communicate with the instance based on the address. The instance of the first application is a general term of server functions that are of the first application and that are deployed in an EDN by a provider of the first application, and may represent one or more EASs.

It should be noted that there may be no direct physical connection between the third network device and the terminal device, and the terminal device sends the identifier of the first application to the third network device via another device. For example, when the third network device is an SMF network element, the terminal device may send the DNS query request including the identifier of the first application to a RAN, the RAN sends the DNS query request to a UPF network element, and the UPF network element sends the DNS query request to the SMF network element. For another example, when the third network device is an NEF network element, the terminal device may send the DNS query request including the identifier of the first application to a RAN, the RAN sends the DNS query request to a UPF network element, and the UPF network element sends the DNS query request to the NEF network element; or the UPF network element sends the DNS query request to an SMF network element, and the SMF network element sends the DNS query request to the NEF network element.

Step 303: The third network device sends a first message to the first network device.

The first message includes the identifier of the first application, and the first message is used to request the address of the instance of the first application. In embodiments of this application, the first message may be an EAS discovery request message. The first message may be implemented based on the application layer hypertext transfer protocol (HTTP) or the session initiation protocol (SIP).

Before sending the first message to the first network device, the third network device may determine, based on the registration information or the indication information, that the first network device can provide the address of the instance of the first application, in other words, the third network device determines that the identifier of the first application is one of identifiers of applications corresponding to the addresses that are of the instances of the applications and that the first network device can provide. For example, the first application is an application A, the identifier of the first application is A-ID, the applications corresponding to the addresses that are of the instances of the applications and that can be provided by the first network device are {application A, application B, application C}, identifiers corresponding to these applications are {A-ID, B-ID, C-ID}, and the registration information is {A-ID, B-ID, C-ID, information about the first network device}, or the indication information is {A-ID, B-ID, C-ID, information about the first network device}. In this case, the third network device determines, based on the identifier that is of the first application and that is included in the registration information, that the first network device can provide the address of the instance of the first application. If there is another first network device that can provide the address of the instance of the first application, the third network device may determine a plurality of first network devices. A specific quantity of determined first network devices may be specified based on a policy of a provider of the third network device. In addition, the quantity of first network devices may be further determined based on other parameters. For details, refer to descriptions in the following step 304.

Step 304: The first network device receives the first message from the third network device, and sends a second message to the second network device based on the registration information and the identifier of the first application.

The second message includes the identifier of the first application, and the second message is used to request the address of the instance of the first application.

Before sending the second message to the second network device, the first network device may determine, based on the registration information, that the second network device can provide the address of the instance of the first application, in other words, the first network device determines that the first application is one of the at least one application whose instance addresses can be provided by the second network device.

For example, the first application is an application A, the identifier of the first application is A-ID, applications corresponding to addresses that are of instances of the applications and that can be provided by the second network device are {application A, application B, application C}, identifiers corresponding to these applications are {A-ID, B-ID, C-ID}, and the registration information is {A-ID, B-ID, C-ID, information about the second network device}. In this case, the first network device determines, based on the identifier that is of the first application and that is included in the registration information, that the first network device can provide the address of the instance of the first application. If there is another second network device that can provide the address of the instance of the first application, the first network device may determine a plurality of second network devices, and the plurality of second network devices may be provided by different providers.

Further, before the first network device sends the second message to the second network device, the first network device may further obtain location information of the terminal device, and the registration information further includes area information corresponding to the second network device. The location information of the terminal device may be a cell identifier of a cell in which the terminal device is located, a tracking area identity, a DNAI, or location information in another format. The area information of the second network device may be network topology area information, for example, a set of a group of cell identifiers, a set of a group of tracking area identities, or a set of a group of DNAIs, or may be a group of information in a geographical area format. Alternatively, the area information of the second network device may be an area of an EDN in which the second network device is located. The area information of the second network device indicates a service area of the second network device, an optimal service area of the second network device, or an access point between the second network device and a mobile communication network. The area information of the second network device may also be understood as optimal routing information, and indicates an optimal routing area.

In this case, the first network device may determine, based on the area information in the registration information and the location information of the terminal device, whether the terminal device matches the second network device.

For example, if determining that a distance between a location of the terminal device and an area (a central point of the area or any boundary of the area) of the second network device is less than or equal to a preset value, the first network device may determine that the location of the terminal device matches the area of the second network device; otherwise, the first network device may determine that the location of the terminal device does not match the area of the second network device. Alternatively, it may be understood that, when a location of the terminal device is a subset of an area of the second network device, in other words, the location of the terminal device is located in the area of the second network device, or when the location of the terminal device has an intersection with the area of the second network device, the first network device determines that the location of the terminal device matches the area of the second network device, and may send the second message to the second network device.

Step 305: The first network device receives the address of the instance of the first application from the second network device, and sends the address of the instance of the first application to the third network device.

Step 306: The third network device receives the address of the instance of the first application from the first network device, and sends the address of the instance of the first application to the terminal device.

In the foregoing procedure, the terminal device supports a DNS protocol. In this case, an address of an instance of an application requested by the terminal device can be determined for the application without changing the terminal device, so that the terminal device can communicate with the instance of the application. In addition, in this solution, the SMF network element or the NEF network element is enhanced, so as to ensure that the selected application server instance is an instance with a relatively optimized network communication distance to the terminal, or even is an optimal instance.

To clearly describe the method provided in this embodiment of this application, the following separately provides descriptions in different possible embodiments with reference to the procedure in FIG. 3.

Embodiment 1

In Embodiment 1, an example in which a first network device is an EES, a second network device is a local DNS server, and a third network device is an SMF network element is used for description.

Figure 4:
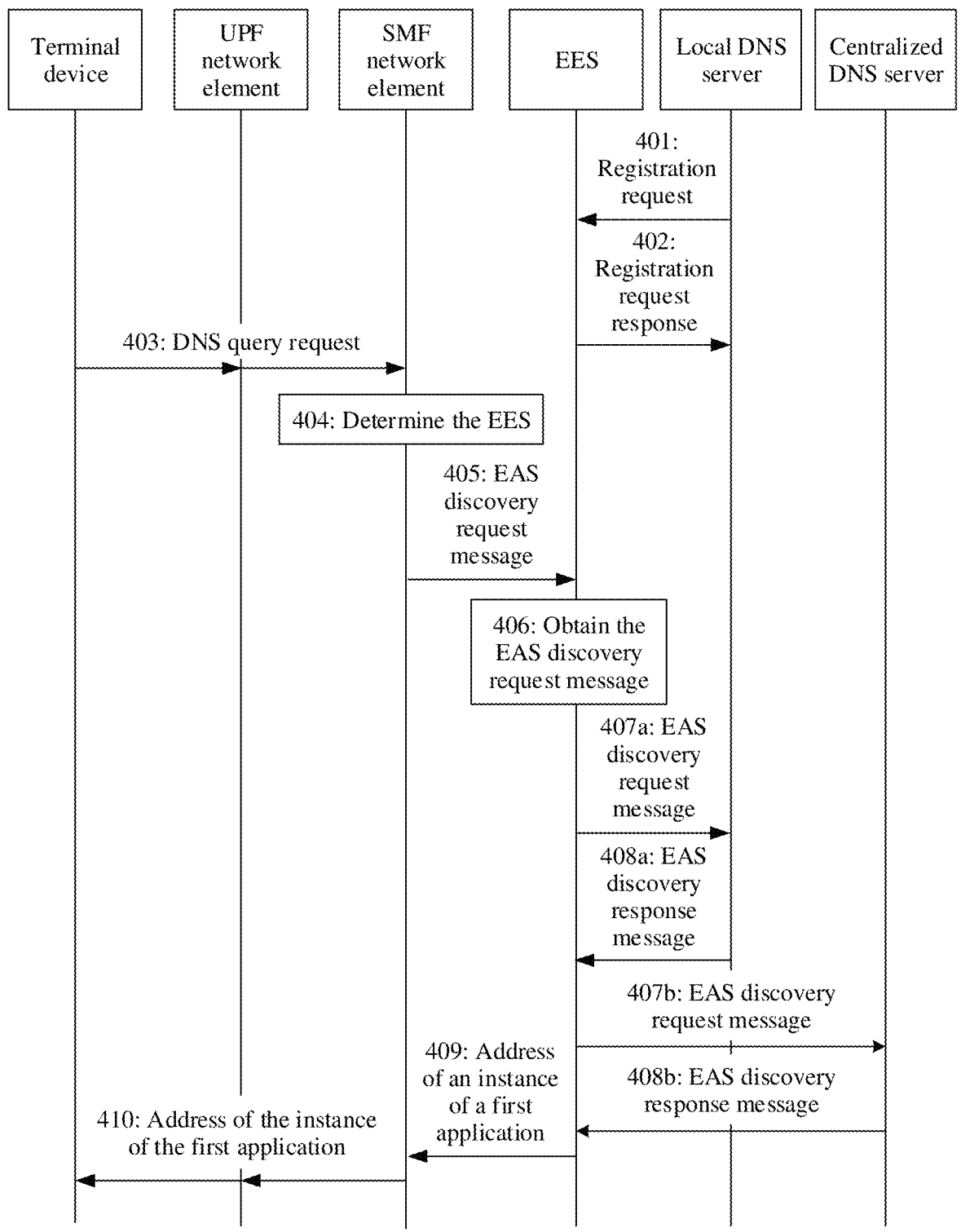
FIG. 4 is a schematic flowchart of obtaining an address of an instance of an application according to an embodiment of this application.

FIG. 4 is a schematic flowchart of a communication method according to an embodiment of this application.

Step 401: The EES obtains a registration request from at least one local DNS server.

A registration request of each local DNS server may include registration information. For specific content of the registration information, refer to the foregoing descriptions. Details are not described herein again.

Registration information sent by a local DNS server may further include information such as an identifier of the local DNS server, area information of the local DNS server, an address (such as an IP address) of the local DNS server, information about an application that can be parsed by the local DNS server, and a provider of the local DNS server.

The information about the application that can be parsed by the local DNS server may indicate the application that can be parsed by the local DNS server. That the local DNS server can parse an application may mean: The local DNS server can determine an address of an instance of the application based on an identifier of the application, in other words, the address is an address that is of an instance of an application and that can be provided by the local DNS server. The area information of the local DNS server may refer to one or more DNAIs corresponding to the local DNS server. When the local server is located in an EDN, the area information of the local DNS server may be area information of the EDN, to be specific, one or more DNAIs of connected areas of the EDN and a mobile communication network.

In some embodiments, the EES may send the obtained registration information to the SMF network element.

In some embodiments, the EES may send, to the SMF network element, the obtained registration information and area information (for example, DNAI(s)) corresponding to the EES. When the SMF network element has obtained the area information (for example, DNAI(s)) corresponding to the EES, the EES may not send the area information (for example, DNAI(s)) corresponding to the EES. The area information (for example, DNAI(s)) corresponding to the EES may be a subset of area information of the connected area of the EDN and the mobile communication network (for example, a subset of the one or more DNAIs).

In some embodiments, the EES may send the obtained registration information and information about the EES to the SMF network element.

In some embodiments, the EES may send indication information to the SMF network element. The indication information may be determined based on the registration information obtained by the EES. For details, refer to the foregoing descriptions.

Step 402: The EES sends a registration request response to the local DNS server, to indicate a registration result. The registration result may be registration success or registration failure.

Content specifically included in the registration request response is not limited in embodiments of this application.

It should be noted that, if the registration information is preconfigured in the EES, steps 401 and 402 may not be performed in this case.

Step 403: A terminal device sends a DNS query request.

The DNS query request includes an identifier of a first application, and is used to request an address of an instance of the first application.

The terminal device may send the DNS query request to a RAN. The DNS query request reaches a UPF network element via the RAN. The UPF network element identifies that the message is a DNS message, and forwards the DNS query request to the SMF network element for processing.

Step 404: The SMF network element receives the DNS query request, and determines the EES.

There may be at least one EES in a current network. The SMF network element may determine the EES from the at least one EES, and obtain the address of the instance of the first application via the determined EES.

In some embodiments, the SMF network element may determine the EES based on location information of the terminal device and the area information of the EES. For example, when a location of the terminal device is in the area indicated by the area information of the EES or has an intersection with the area indicated by the area information of the EES, the terminal device determines to request the address of the instance of the first application from the EES. The area information of the EES may be the DNAIs corresponding to the EES.

In some embodiments, when the SMF network element obtains registration information or indication information sent by a plurality of EESs, the SMF network element may determine the EES based on location information of the terminal device, the area information of the EES, and the registration information or the indication information. In some embodiments, the EES determined by the SMF may be an EES that can provide the address of the instance of the first application.

The location information of the terminal device may be DNAI(s) of the terminal device, a cell identifier of a cell accessed by the terminal device, or the like.

Step 405: The SMF network element sends an EAS discovery request message to the EES, where the EAS discovery request message includes the identifier of the first application.

The EAS discovery request message is used to request the address of the instance of the first application.

The EAS discovery request message may correspond to the first message in the procedure shown in FIG. 3.

The SMF network element may generate the EAS discovery request message based on the received DNS query request, and send the EAS discovery request message to the determined EES. The first message may further include information such as the location information of the terminal device.

Step 406: The EES obtains the EAS discovery request message, and obtains the address of the instance of the first application based on the EAS discovery request message.

In some embodiments, if the address of the instance of the first application already exists in the EES, the EES sends the application instance address of the instance of the first application to the SMF network element. For example, the EES has previously received a request message that is sent by another device and that is used to request the application instance address of the instance of the first application. In this case, the EES may have cached the address of the instance of the first application.

In some embodiments, the EES may select, from the at least one local DNS server, a local DNS server that can provide the address of the instance of the first application, and obtain the address of the instance of the first application via the selected local DNS server.

For example, the EES may obtain a plurality of pieces of registration information, and the EES may determine, based on the identifier of the first application and the plurality of pieces of registration information, the local DNS server that can provide the address of the instance of the first application, so as to send a request message to the local DNS server.

In some embodiments, if there are a plurality of local DNS servers that can provide the address of the instance of the first application, the EES may further determine, based on the location information of the terminal device, area information of each of the plurality of local DNS servers, providers of the local DNS servers, and the like, a local DNS server matching the terminal device. For example, the EES may determine a local DNS server whose distance to the location of the terminal device is less than or equal to a preset value as the matching local DNS server. For details about a matching manner, refer to the foregoing descriptions.

For details about a process in which the EES may obtain the address via the determined local DNS server, refer to step 407*a* and step 408*a*.

Step 407*a*: The EES sends an EAS discovery request message or a DNS query request to the local DNS server.

The EAS discovery request message includes the identifier of the first application, and is used to request the address of the instance of the first application. A source IP address of the EAS discovery request message is an IP address of the EES.

The EAS discovery request message may also be replaced with the DNS query message, and details are not described herein again.

Step 408*a*: The local DNS server determines the address of the instance of the first application based on the EAS discovery request message, and sends the address of the instance of the first application to the EES based on an EAS discovery response message.

When the EES sends the DNS query request to the local DNS server, the EAS discovery request message is replaced with a DNS response message. Details are not described again.

In some embodiments, the EES may further obtain the address of the instance of the first application via a centralized DNS server. For example, when the EES does not have information about the local DNS server, or the local DNS server cannot provide the requested address of the instance of the application, this manner may be used. For details, refer to step 407*b* and step 408*b*.

Step 407*b*: The EES sends an EAS discovery request message to the centralized DNS server.

The EAS discovery request message includes the identifier of the first application, and is used to request the address of the instance of the first application. A source IP address of the EAS discovery request message is an IP address of the EES. The EAS discovery request message may also be replaced with a DNS query message, and details are not described herein again.

Step 408*b*: The centralized DNS server determines the address of the instance of the first application based on the EAS discovery request message, and sends the address of the instance of the first application to the EES based on an EAS discovery response message. When the EES sends the DNS query request to the local DNS server, the EAS discovery response message is replaced with a DNS response message. Details are not described again.

Step 409: After obtaining the address of the instance of the first application, the EES sends the address of the instance of the first application to the SMF network element.

The EES may send the address of the instance of the first application based on an EAS discovery response message. The EAS discovery response message may further include other information about an application server instance. This is not limited in embodiments of this application.

Step 410: After receiving the address of the instance of the first application, the SMF network element sends the address of the instance of the first application to the terminal device.

The SMF network element may send the address of the instance of the first application based on a DNS query response. The DNS query response may be sent to the terminal device via the UPF network element and the RAN. A specific process is not described again.

Embodiment 2

In Embodiment 2, an example in which a first network device is an EES, a second network device is a local DNS server, and a third network device is an ECS is used for description. A procedure in Embodiment 2 is basically the same as that in Embodiment 1. A main difference lies in that in Embodiment 2, an SMF network element no longer directly interacts with the EES to obtain an address of an instance of an application, but interacts with the ECS to obtain the address of the instance of the application.

Figure 5:
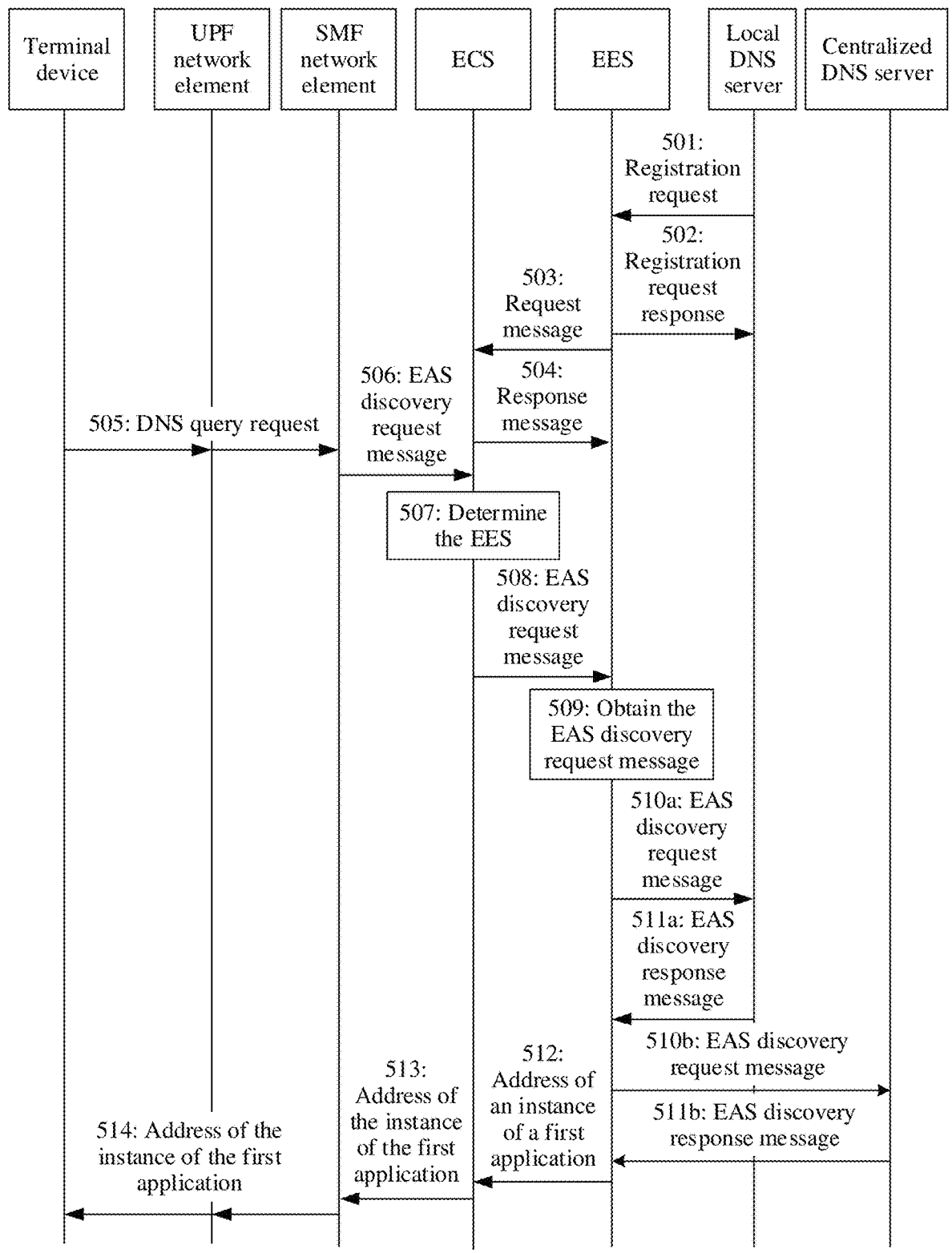
FIG. 5 is a schematic flowchart of obtaining an address of an instance of an application according to an embodiment of this application.

FIG. 5 is a schematic flowchart of a communication method according to an embodiment of this application.

Step 501: The EES obtains a registration request from at least one local DNS server.

For specific content included in the registration request, refer to the descriptions in step 401.

Step 502: The EES sends a registration request response to the local DNS server, to indicate a registration result. The registration result may be registration success or registration failure.

Content specifically included in the registration request response is not limited in embodiments of this application.

It should be noted that, if registration information is preconfigured in the EES, steps 501 and 502 may not be performed in this case.

Step 503: The EES sends a request message to the ECS, where the request message indicates information about an application whose instance address can be provided by the EES.

The request message may include an identifier of at least one application and information about the EES.

In some embodiments, the EES may send, to the ECS, the registration information included in the obtained registration request.

In some embodiments, the EES may send, to the ECS, the registration information included in the obtained registration request and DNAI(s) corresponding to the EES.

In some embodiments, the EES may send, to the ECS, the registration information included in the obtained registration request and information about the EES.

In some embodiments, the EES may send indication information to the ECS, where the indication information indicates the application whose instance address can be provided by the EES. The indication information may be determined based on the registration information obtained by the EES. For details, refer to the foregoing descriptions.

Specifically, the request information may be an EES registration request message, an EES registration update message, an EES update message, or the like. A name of the request message is not limited in embodiments of this application.

Step 504: The ECS sends a response message to the EES.

In some embodiments, further, the ECS may send, to the SMF network element, the obtained at least one piece of registration information or the indication information determined based on the at least one piece of registration information. Alternatively, the SMF network element may request at least one piece of registration information or the indication information from the ECS, so that the SMF network element may subsequently select a proper local DNS server, an EES, or an ECS based on a DNS query request of a terminal device, to obtain an address that is of an instance of an application and that is requested by the terminal device.

Step 505: The terminal device sends the DNS query request.

The DNS query request includes an identifier of a first application, and is used to request an address of an instance of the first application.

The terminal device may send the DNS query request to a RAN. The DNS query request reaches a UPF network element via the RAN. The UPF network element identifies that the message is a DNS message, and forwards the DNS query request to the SMF network element for processing.

Step 506: The SMF network element obtains the DNS query request, and sends an EAS discovery request message to the ECS.

The EAS discovery request message is used to request the address of the instance of the first application.

The EAS discovery request message may include the identifier of the first application, and may further include location information of the terminal device, and the like.

The location information of the terminal device may be DNAI(s) of the terminal device, a cell identifier of a cell accessed by the terminal device, or the like.

In some embodiments, the SMF network element may not send an EAS discovery request message to the ECS. When the SMF network element receives the DNS query request of the terminal device, if the SMF has obtained the registration information of the at least one local DNS server or the indication information via the ECS, the SMF network element may select a local DNS server, and send an EAS discovery request or a DNS query request to the local DNS server, to obtain the address that is of the instance of the first application and that is requested by the terminal device. When obtaining the address of the instance of the first application via the local DNS server, the SMF network element may perform step 514.

For a manner in which the SMF network element selects the local DNS server, refer to the foregoing manner in which the EES selects the local DNS server. A specific process is not described again.

In some embodiments, the SMF network element may not send an EAS discovery request message to the ECS. When the SMF network element receives the DNS query request of the terminal device, if the SMF has obtained the indication information via the ECS, the SMF network element may select an EES, and send an EAS discovery request or a DNS query request to the EES, to obtain the address that is of the instance of the first application and that is requested by the terminal device. When obtaining the address of the instance of the first application via the EES, the SMF network element may perform step 405.

For a manner in which the SMF network element selects the EES, refer to the foregoing manner in which the EES selects the local DNS server. A specific process is not described again.

Step 507: The ECS receives the EAS discovery request message, and determines the EES.

There may be at least one EES in a current network. The ECS may determine the EES from the at least one EES, and obtain the address of the instance of the first application via the determined EES.

In some embodiments, the ECS may determine the EES based on the location information of the terminal device and area information (namely, the DNAIs corresponding to the EES) of the EES.

In some embodiments, when the ECS obtains registration information or indication information sent by a plurality of EESs, the ECS may determine the EES based on the location information of the terminal device, area information of the EES, and the registration information or the indication information. In some embodiments, the EES determined by the SMF may be an EES that can provide the address of the instance of the first application.

Step 508: The ECS sends an EAS discovery request message to the EES, where the EAS discovery request message includes the identifier of the first application.

The EAS discovery request message is used to request the address of the instance of the first application, and the EAS discovery request message may further include information such as the location information of the terminal device.

The EAS discovery request message in this step may correspond to the first message in the procedure in FIG. 3.

Step 509: The EES obtains the EAS discovery request message, and obtains the address of the instance of the first application based on the EAS discovery request message.

In this step, the EES may determine the local DNS server that can provide the address of the instance of the first application. For specific content, refer to the descriptions in step 406. Details are not described herein again.

For details about a process in which the EES may obtain the address via the selected local DNS server, refer to step 510*a* and step 511*a*.

Step 510*a*: The EES sends an EAS discovery request message to the local DNS server.

The EAS discovery request message includes the identifier of the first application, and is used to request the address of the instance of the first application. A source IP address of the EAS discovery request message is an IP address of the EES. The EAS discovery request message may also be replaced with a DNS query message, and details are not described herein again.

Step 511*a*: The local DNS server determines the address of the instance of the first application based on the EAS discovery request message, and sends the address of the instance of the first application to the EES based on an EAS discovery response message.

In some embodiments, the EES may obtain the address via a centralized DNS server. For details, refer to step 510*b* and step 511*b*.

Step 510*b*: The EES sends an EAS discovery request message to the centralized DNS server.

The EAS discovery request message includes the identifier of the first application, and is used to request the address of the instance of the first application. A source IP address of the EAS discovery request message is an IP address of the EES. The EAS discovery request message may also be replaced with a DNS query message, and details are not described herein again.

Step 511b: The centralized DNS server determines the address of the instance of the first application based on the EAS discovery request message, and sends the address of the instance of the first application to the EES based on an EAS discovery response message.

Step 512: After obtaining the address of the instance of the first application, the EES sends the address of the instance of the first application to the ECS.

When a first message is an EAS discovery request message, the EES may send the address of the instance of the first application based on an EAS discovery response message. The EAS discovery response message may further include other content. This is not limited in embodiments of this application.

In some embodiments, if the ECS has obtained the registration information of the at least one local DNS server or the indication information via the EES, the ECS may select a local DNS server and send an EAS discovery request or a DNS query request, to obtain the address that is of the instance of the application and that is requested by the terminal device. For a manner in which the ECS selects the local DNS server, refer to the foregoing manner in which the EES selects the local DNS server. Details are not described herein again.

Step 513: After receiving the address of the instance of the first application, the ECS sends the address of the instance of the first application to the SMF network element.

For example, the ECS may send the address of the instance of the first application based on an EAS discovery response.

Step 514: After receiving the address of the instance of the first application, the SMF network element sends the address of the instance of the first application to the terminal device.

For example, the SMF network element may send the address of the instance of the first application based on a DNS query response.

The DNS query response may be forwarded to the terminal device via the UPF network element and the RAN. A specific process is not described again.

Embodiment 3

In Embodiment 3, an example in which a first network device is an ECS, a second network device is a local DNS server, and a third network device is an SMF network element is used for description. In Embodiment 3, the local DNS server directly interacts with the ECS, and the local DNS server may not send a registration request to an EES.

Figure 6:
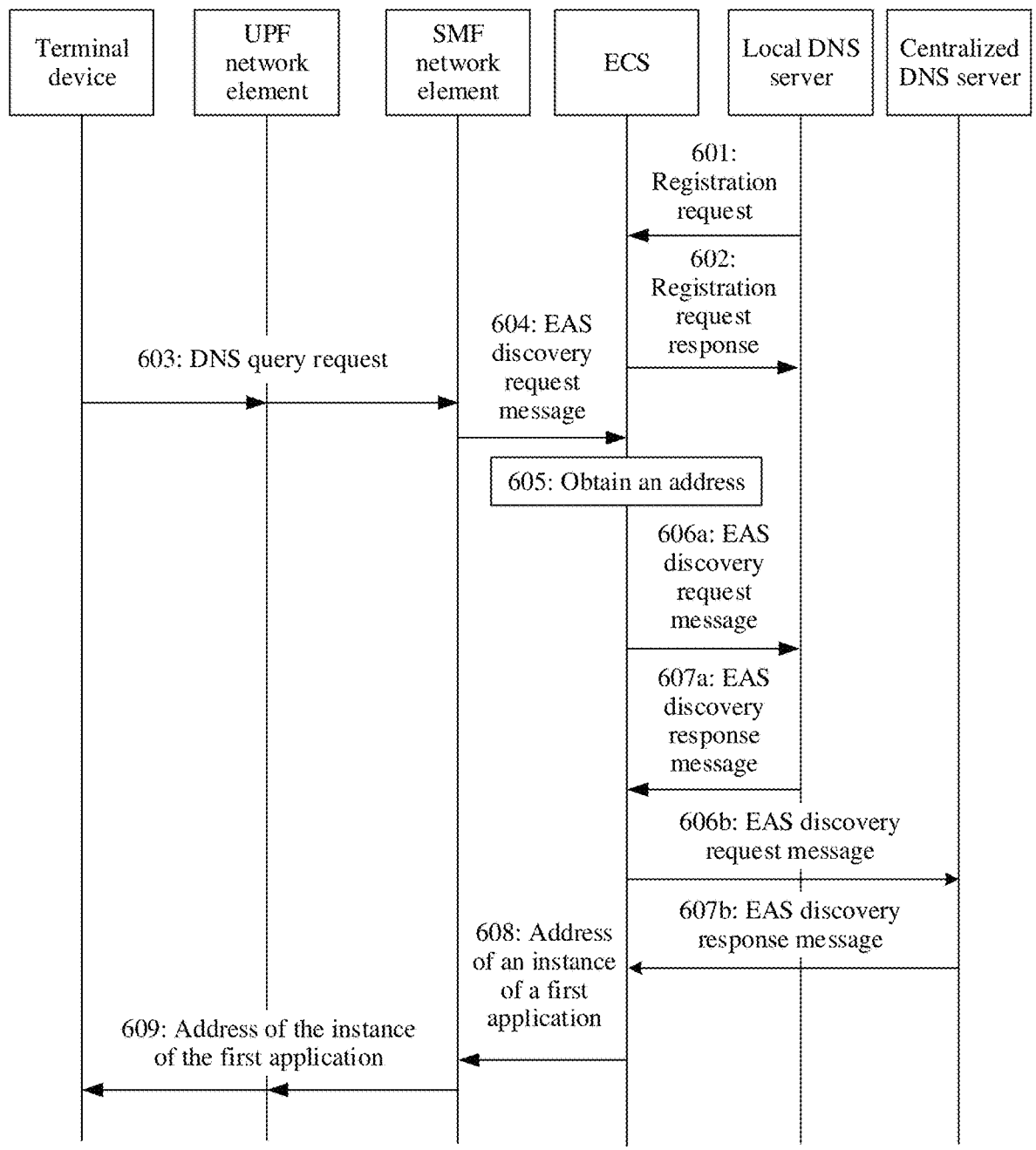
FIG. 6 is a schematic flowchart of obtaining an address of an instance of an application according to an embodiment of this application.

FIG. 6 is a schematic flowchart of a communication method according to an embodiment of this application.

Step 601: The ECS obtains a registration request from at least one local DNS server.

For specific content included in the registration request, refer to the descriptions in step 401.

In some embodiments, the ECS may send obtained registration information to the SMF network element.

In some embodiments, the ECS may send the obtained registration information and information about the ECS to the SMF network element.

In some embodiments, the ECS may send indication information to the SMF network element. The indication information may be determined based on registration information obtained by the ECS. For details, refer to the foregoing descriptions.

Step 602: The ECS sends a registration request response to the local DNS server, to indicate a registration result. The registration result may be registration success or registration failure.

Content specifically included in the registration request response is not limited in embodiments of this application.

It should be noted that, if the registration information is preconfigured in the ECS, steps 601 and 602 may not be performed in this case.

Step 603: A terminal device sends a DNS query request.

For this step, refer to the descriptions in step 403. Details are not described herein again.

Step 604: The SMF network element obtains the DNS query request, and sends an EAS discovery request message to the ECS.

The EAS discovery request message in this step may correspond to the first message in the procedure in FIG. 3.

The EAS discovery request message is used to request an address of an instance of a first application. The EAS discovery request message may include an identifier of the first application, and may further include location information of the terminal device, and the like.

The location information of the terminal device may be DNAI(s) of the terminal device, a cell identifier of a cell accessed by the terminal device, or the like.

In some embodiments, the SMF network element may not send an EAS discovery request message to the ECS. When the SMF network element receives the DNS query request of the terminal device, if the SMF has obtained the registration information of the at least one local DNS server or the indication information via the ECS, the SMF network element may select a local DNS server, and send an EAS discovery request or a DNS query request to the local DNS server, to obtain an address that is of an instance of a first application and that is requested by the terminal device. When obtaining the address of the instance of the first application via the local DNS server, the SMF network element may perform step 609. In this case, step 605 to step 608 may not be performed.

For a manner in which the SMF network element selects the local DNS server, refer to the foregoing manner in which the EES selects the local DNS server. A specific process is not described again.

Step 605: The ECS receives the EAS discovery request message, and obtains the address of the instance of the first application based on the EAS discovery request message.

In some embodiments, if the address of the instance of the first application already exists in the ECS, the ECS sends the application instance address of the instance of the first application to the SMF network element.

In some embodiments, the ECS may select, from the at least one local DNS server, a local DNS server that can provide the address of the instance of the first application.

For example, the ECS may obtain a plurality of pieces of registration information, and may determine, based on the identifier of the first application and the plurality of pieces of registration information, the local DNS server that can provide the address of the instance of the first application, so as to send a request message to the local DNS server.

In some embodiments, if there are a plurality of local DNS servers that can provide the address of the instance of the first application, the ECS may further determine, based on the location information of the terminal device, area information of each of the plurality of local DNS servers, providers of the local DNS servers, and the like, a local DNS server matching the terminal device. For example, the ECS may determine a local DNS server whose distance to a location of the terminal device is less than or equal to a preset value as the matching local DNS server. For details about a matching manner, refer to the foregoing descriptions.

For details about a process in which the ECS obtains the address via the determined local DNS server, refer to step 606*a* and step 607*a*.

Step 606*a*: The ECS sends an EAS discovery request message to the local DNS server.

The EAS discovery request message may also be replaced with a DNS query message, and details are not described herein again.

The EAS discovery request message includes the identifier of the first application, and is used to request the address of the instance of the first application. A source IP address of the EAS discovery request message is an IP address of the EES.

Step 607*a*: The local DNS server determines the address of the instance of the first application based on the EAS discovery request message, and sends the address of the instance of the first application to the ECS based on an EAS discovery response message.

In some embodiments, the ECS may obtain the address via a centralized DNS server. For example, when the ECS does not have information about the local DNS server, or the local DNS server cannot provide the requested address of the instance of the application, this manner may be used. For details, refer to step 606*b* and step 605*b*.

Step 606*b*: The ECS sends an EAS discovery request message to the centralized DNS server.

The EAS discovery request message includes the identifier of the first application, and is used to request the address of the instance of the first application. A source IP address of the EAS discovery request message is an IP address of the EES. The EAS discovery request message may also be replaced with a DNS query message, and details are not described herein again.

Step 607*b*: The centralized DNS server determines the address of the instance of the first application based on the EAS discovery request message, and sends the address of the instance of the first application to the ECS based on an EAS discovery response message.

When the ECS sends the DNS query request to the local DNS server, the EAS discovery response message is replaced with a DNS response message. Details are not described again.

Step 608: After obtaining the address of the instance of the first application, the ECS sends the address of the instance of the first application to the SMF network element.

For example, the ECS may send the address of the instance of the first application based on an EAS discovery response.

Step 609: After receiving the address of the instance of the first application, the SMF network element sends the address of the instance of the first application to the terminal device.

For example, the SMF network element may send the address of the instance of the first application based on a DNS query response.

The DNS query response may be forwarded to the terminal device via a UPF network element and a RAN. A specific process is not described again.

For step 608 and step 609, refer to the foregoing related descriptions. Details are not described herein again.

Embodiment 4

In Embodiment 4, an example in which a first network device is an EES, a second network device is a local DNS server, and a third network device is an NEF network element is used for description. A procedure in Embodiment 4 is basically the same as that in Embodiment 2, and a main difference lies in that actions and functions performed by the ECS in Embodiment 2 are performed by the NEF network element in Embodiment 4.

Figure 7:
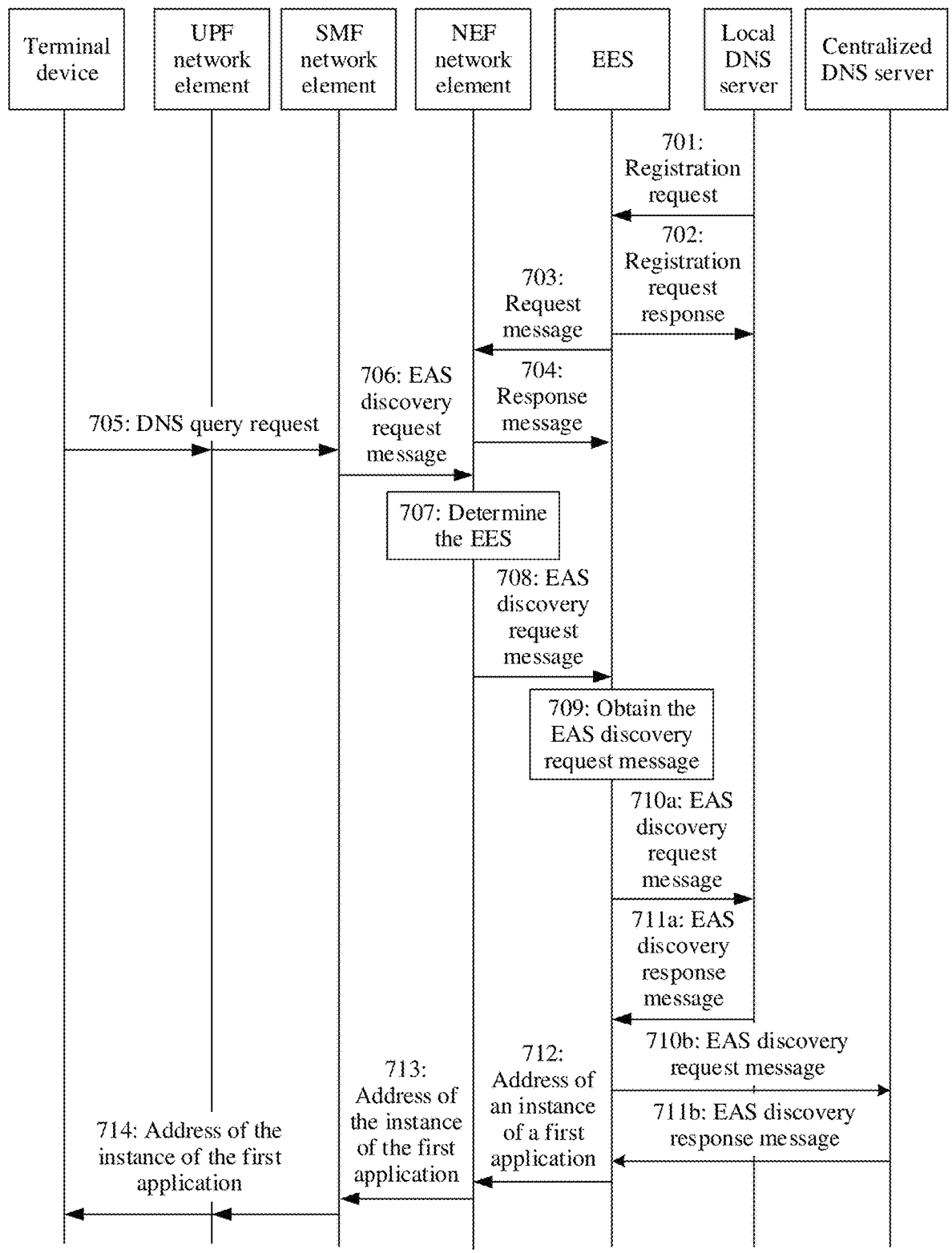
FIG. 7 is a schematic flowchart of obtaining an address of an instance of an application according to an embodiment of this application.

FIG. 7 is a schematic flowchart of a communication method according to an embodiment of this application.

Step 701: The EES obtains a registration request from at least one local DNS server.

For specific content included in the registration request, refer to the descriptions in step 401.

Step 702: The EES sends a registration request response to the local DNS server, to indicate a registration result. The registration result may be registration success or registration failure.

Content specifically included in the registration request response is not limited in embodiments of this application.

It should be noted that, if registration information is preconfigured in the EES, steps 701 and 702 may not be performed in this case.

Step 703: The EES sends a request message to the NEF network element, where the request message indicates information about an application whose instance address can be provided by the EES.

In some embodiments, the EES may send, to the NEF network element, the registration information included in the obtained registration request.

In some embodiments, the EES may send, to the NEF network element, the registration information included in the obtained registration request and DNAI(s) corresponding to the EES.

In some embodiments, the EES may send indication information to the NEF network element, where the indication information indicates the application whose instance address can be provided by the EES. The indication information may be determined based on the registration information obtained by the EES. For details, refer to the foregoing descriptions.

The request message may include an identifier of at least one application and information about the EES.

Specifically, the request information may be a registration request message, a registration update message, or the like. A name of the request message is not limited in embodiments of this application.

Step 704: The NEF network element sends a response message to the EES.

Step 705: A terminal device sends a DNS query request.

The DNS query request includes an identifier of a first application, and is used to request an address of an instance of the first application.

The terminal device may send the DNS query request to a RAN. The DNS query request reaches a UPF network element via the RAN. The UPF network element identifies that the message is a DNS message, and forwards the DNS query request to an SMF network element for processing.

Step 706: The SMF network element obtains the DNS query request, and sends an EAS discovery request message to the NEF network element.

The EAS discovery request message is used to request the address of the instance of the first application.

The EAS discovery request message may include the identifier of the first application, and may further include location information of the terminal device, and the like.

The location information of the terminal device may be DNAI(s) of the terminal device, a cell identifier of a cell accessed by the terminal device, or the like.

Step 707: The NEF network element receives the EAS discovery request message, and determines the EES.

There may be at least one EES in a current network. The NEF network element may determine the EES from the at least one EES, and obtain the address of the instance of the first application via the determined EES.

In some embodiments, the NEF network element may alternatively not determine the EES. When the NEF network element receives the DNS query request of the terminal device, if the NEF network element has obtained the registration information of the at least one local DNS server or the indication information via the EES, the NEF network element may select a local DNS server, and send an EAS discovery request or a DNS query request to the local DNS server, to obtain the address that is of the instance of the first application and that is requested by the terminal device. When obtaining the address of the instance of the first application via the local DNS server, the NEF network element may perform step 713.

For a manner in which the NEF network element selects the local DNS server, refer to the foregoing manner in which the EES selects the local DNS server. A specific process is not described again.

Step 708: The NEF network element sends an EAS discovery request message to the EES, where the EAS discovery request message includes the identifier of the first application.

Step 709: The EES obtains the EAS discovery request message, and obtains the address based on the EAS discovery request message.

In some embodiments, if the address of the instance of the first application already exists in the EES, the EES sends the application instance address of the instance of the first application to the NEF network element.

In some embodiments, for details about a process in which the EES may obtain the address via a selected local DNS server, refer to step 710a and step 711a.

Step 710a: The EES sends an EAS discovery request message to the local DNS server.

Step 711a: The local DNS server determines the address of the instance of the first application based on the EAS discovery request message, and sends the address of the instance of the first application to the EES based on an EAS discovery response message.

In some embodiments, the EES may obtain the address via a centralized DNS server. For details, refer to step 710b and step 711b.

Step 710b: The EES sends an EAS discovery request message to the centralized DNS server.

Step 711b: The centralized DNS server determines the address of the instance of the first application based on the EAS discovery request message, and sends the address of the instance of the first application to the EES based on an EAS discovery response message.

Step 712: After obtaining the address of the instance of the first application, the EES sends the address of the instance of the first application to the NEF network element.

Step 713: After receiving the address of the instance of the first application, the NEF network element sends the address of the instance of the first application to the SMF network element.

Step 714: After receiving the address of the instance of the first application, the SMF network element sends the address of the instance of the first application to the terminal device.

The SMF network element may send the address of the instance of the first application based on a DNS query response.

The DNS query response may be forwarded to the terminal device via the UPF network element and the RAN. A specific process is not described again.

For step 709 to step 714, refer to descriptions in step 509 to step 514. Details are not described herein again.

Embodiment 5

In Embodiment 5, an example in which a first network device is an EES, a second network device is a local DNS server, and a third network device is an NEF network element is used for description. A procedure in Embodiment 5 is basically the same as that in Embodiment 4, and a main difference lies in that in Embodiment 5, an NEF network element no longer directly interacts with the EES, but interacts with an ECS.

Figure 8:
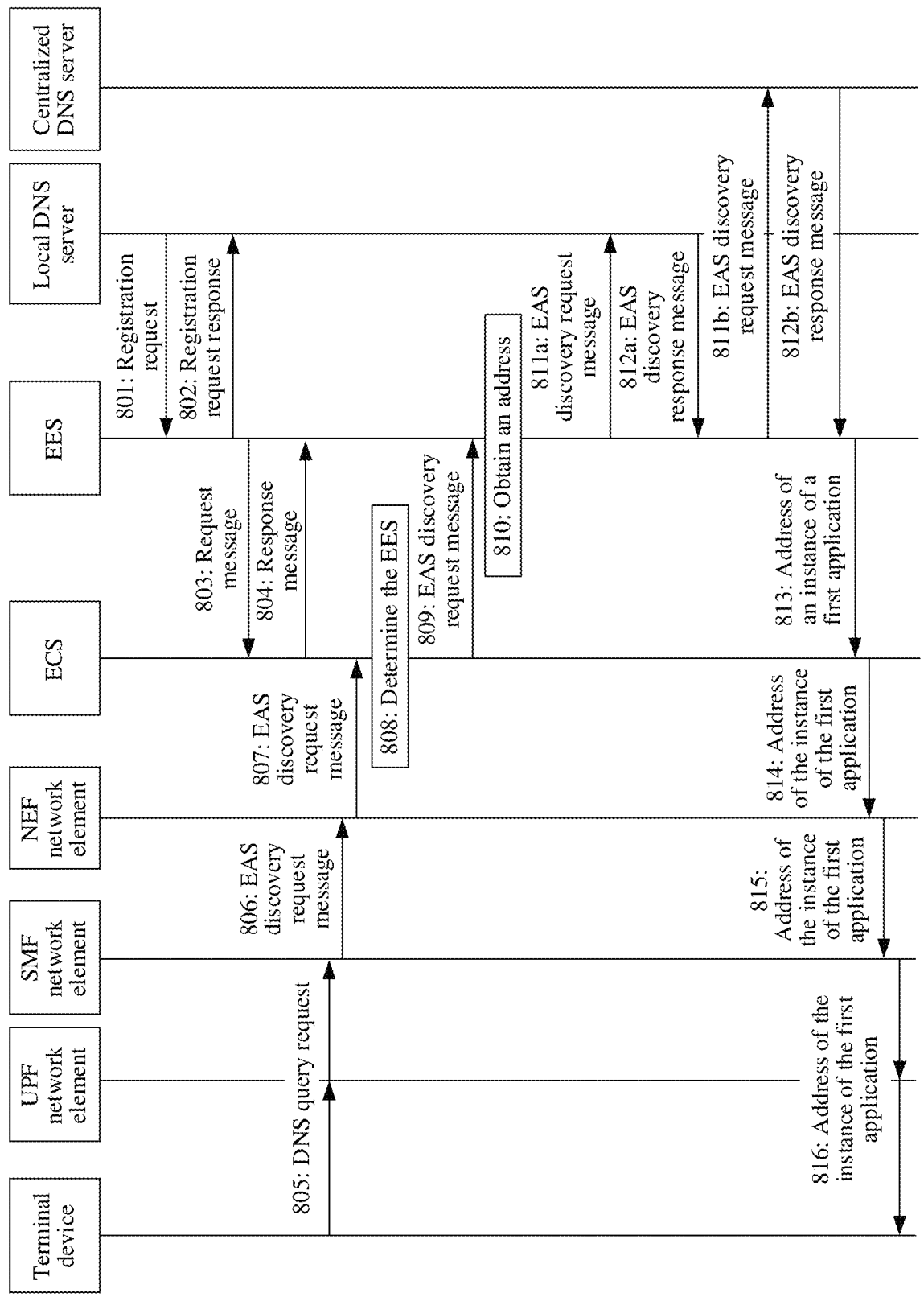
FIG. 8 is a schematic flowchart of obtaining an address of an instance of an application according to an embodiment of this application.

FIG. 8 is a schematic flowchart of a communication method according to an embodiment of this application.

Step 801: The EES obtains a registration request from at least one local DNS server.

For specific content included in the registration request, refer to the descriptions in step 401.

Step 802: The EES sends a registration request response to the local DNS server, to indicate a registration result. The registration result may be registration success or registration failure.

Content specifically included in the registration request response is not limited in embodiments of this application.

It should be noted that, if registration information is preconfigured in the EES, steps 801 and 802 may not be performed in this case.

Step 803: The EES sends a request message to the ECS, where the request message indicates information about an application whose instance address can be provided by the EES.

The request message may include an identifier of at least one application and information about the EES.

In some embodiments, the EES may send, to the ECS, the registration information included in the obtained registration request.

In some embodiments, the EES may send, to the ECS, the registration information included in the obtained registration request and DNAI(s) corresponding to the EES.

In some embodiments, the EES may send indication information to the ECS, where the indication information indicates the application whose instance address can be provided by the EES. The indication information may be determined based on the registration information obtained by the EES. For details, refer to the foregoing descriptions.

Specifically, the request information may be a registration request message, a registration update message, or the like. A name of the request message is not limited in embodiments of this application.

Step 804: The ECS network element sends a response message to the EES.

In some embodiments, the ECS may further send at least one piece of obtained registration information to the NEF network element.

In some embodiments, the ECS may send the indication information to the NEF network element, where the indication information indicates the application whose instance address can be provided by the EES.

Step 805: A terminal device sends a DNS query request.

The DNS query request includes an identifier of a first application, and is used to request an address of an instance of the first application.

The terminal device may send the DNS query request to a RAN. The DNS query request reaches a UPF network element via the RAN. The UPF network element identifies that the message is a DNS message, and forwards the DNS query request to an SMF network element for processing.

Step 806: The SMF network element obtains the DNS query request, and sends an EAS discovery request message to the NEF network element.

The EAS discovery request message is used to request the address of the instance of the first application.

The EAS discovery request message may include the identifier of the first application, and may further include location information of the terminal device, and the like.

The location information of the terminal device may be DNAI(s) of the terminal device, a cell identifier of a cell accessed by the terminal device, or the like.

Step 807: The NEF network element receives the EAS discovery request message, and sends an EAS discovery request message to the ECS, where the EAS discovery request message includes the identifier of the first application.

In some embodiments, the NEF network element may not send an EAS discovery request message to the ECS. When the NEF network element receives the DNS query request of the terminal device, if the NEF network element has obtained the registration information of the at least one local DNS server or the indication information via the ECS, the NEF network element may select a local DNS server, and send an EAS discovery request or a DNS query request to the local DNS server, to obtain the address that is of the instance of the first application and that is requested by the terminal device. When obtaining the address of the instance of the first application via the local DNS server, the NEF network element may perform step 815.

For a manner in which the NEF network element selects the local DNS server, refer to the foregoing manner in which the EES selects the local DNS server. A specific process is not described again.

In some embodiments, the NEF network element may not send an EAS discovery request message to the ECS. When the NEF network element receives the DNS query request of the terminal device, if the NEF has obtained the indication information via the ECS, the NEF network element may select an EES, and send an EAS discovery request or a DNS query request to the EES, to obtain the address that is of the instance of the first application and that is requested by the terminal device. When obtaining the address of the instance of the first application via the EES, the NEF network element may perform step 708.

For a manner in which the NEF network element selects the EES, refer to the manner in which the SMF network element selects the EES. A specific process is not described again.

Step 808: The ECS receives the EAS discovery request message, and determines the EES.

There may be at least one EES in a current network. The NEF network element may determine the EES from the at least one EES, and obtain the address of the instance of the first application via the determined EES.

In some embodiments, if the ECS has obtained the registration information of the at least one local DNS server or the indication information via the EES, the ECS may select a local DNS server and send an EAS discovery request or a DNS query request, to obtain the address that is of the instance of the application and that is requested by the terminal device. For a manner in which the ECS selects the local DNS server, refer to the foregoing manner in which the EES selects the local DNS server. Details are not described herein again.

Step 809: The ECS sends an EAS discovery request message to the EES, where the EAS discovery request message includes the identifier of the first application.

Step 810: The EES obtains the EAS discovery request message, and obtains the address of the first application based on the EAS discovery request message.

In some embodiments, if the address of the instance of the first application already exists in the EES, the EES sends the application instance address of the instance of the first application to the NEF network element.

In some embodiments, the EES obtains the address via a selected local DNS server. For details, refer to step 811*a* and step 812*a*.

Step 811*a*: The EES sends an EAS discovery request message to the local DNS server.

Step 812*a*: The local DNS server determines the address of the instance of the first application based on the EAS discovery request message, and sends the address of the instance of the first application to the EES based on an EAS discovery response message.

In some embodiments, the EES may obtain the address via a centralized DNS server. For details, refer to step 811*b* and step 812*b*.

Step 811*b*: The EES sends an EAS discovery request message to the centralized DNS server.

Step 812*b*: The centralized DNS server determines the address of the instance of the first application based on the EAS discovery request message, and sends the address of the instance of the first application to the EES based on an EAS discovery response message.

Step 813: After obtaining the address of the instance of the first application, the EES sends the address of the instance of the first application to the ECS.

Step 814: After obtaining the address of the instance of the first application, the ECS sends the address of the instance of the first application to the NEF network element.

Step 815: After receiving the address of the instance of the first application, the NEF network element sends the address of the instance of the first application to the SMF network element.

Step 816: After receiving the address of the instance of the first application, the SMF network element sends the address of the instance of the first application to the terminal device.

For example, the SMF network element may send the address of the instance of the first application based on a DNS query response.

The DNS query response may be forwarded to the terminal device via the UPF network element and the RAN. A specific process is not described again.

Embodiment 6

In Embodiment 6, an example in which a first network device is an EES, a second network device is a local DNS server, and a third network device is an NEF network element or an SMF network element is used for description. A procedure in Embodiment 6 is basically the same as that in Embodiment 3, and a main difference lies in that in Embodiment 3, the SMF network element directly interacts with the ECS, and in Embodiment 6, the SMF network element interacts with an ECS via the NEF network element.

Figure 9:
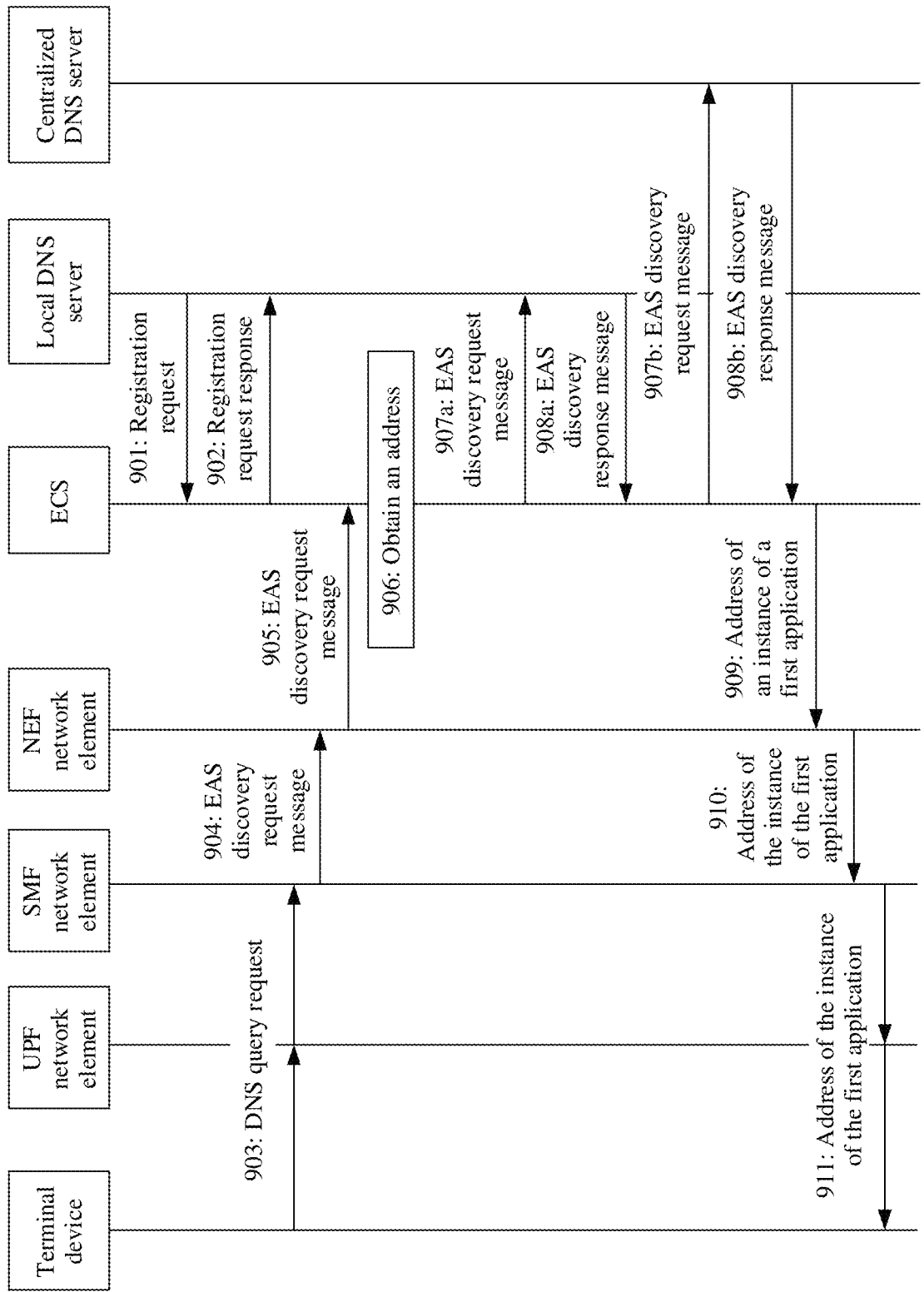
FIG. 9 is a schematic flowchart of obtaining an address of an instance of an application according to an embodiment of this application.

FIG. 9 is a schematic flowchart of a communication method according to an embodiment of this application.

Step 901: The ECS obtains a registration request from at least one local DNS server.

For specific content included in the registration request, refer to the descriptions in step 401.

Step 902: The ECS sends a registration request response to the local DNS server, to indicate a registration result. The registration result may be registration success or registration failure.

Content specifically included in the registration request response is not limited in embodiments of this application.

It should be noted that, if registration information is preconfigured in the ECS, steps 901 and 902 may not be performed in this case.

In some embodiments, the ECS may send the obtained registration information to the NEF.

In some embodiments, the ECS may send indication information to the NEF network element. The indication information may be determined based on the registration information obtained by the ECS. For details, refer to the foregoing descriptions.

Step 903: A terminal device sends a DNS query request.

For this step, refer to the descriptions in step 403. Details are not described herein again.

Step 904: The SMF network element obtains the DNS query request, and sends an EAS discovery request message to the NEF network element.

The EAS discovery request message is used to request an address of an instance of a first application. The EAS discovery request message may include an identifier of the first application, and may further include location information of the terminal device, and the like.

The location information of the terminal device may be DNAI(s) of the terminal device, a cell identifier of a cell accessed by the terminal device, or the like.

Step 905: The NEF network element receives the EAS discovery request message, and forwards the EAS discovery request message to the ECS.

In some embodiments, the NEF network element may not send an EAS discovery request message to the ECS. When the NEF network element receives the DNS query request of the terminal device, if the NEF network element has obtained the registration information of the at least one local DNS server or the indication information via the ECS, the NEF network element may select a local DNS server, and send an EAS discovery request or a DNS query request to the local DNS server, to obtain the address that is of the instance of the first application and that is requested by the terminal device. When obtaining the address of the instance of the first application via the local DNS server, the NEF network element may perform step 910.

For a manner in which the NEF network element selects the local DNS server, refer to the foregoing manner in which the EES selects the local DNS server. A specific process is not described again.

Step 906: The ECS receives the EAS discovery request message, and obtains the address of the instance of the first application based on the EAS discovery request message.

In some embodiments, if the address of the instance of the first application already exists in the ECS, the ECS sends the application instance address of the instance of the first application to the SMF network element. For specific content, refer to the descriptions in step 507. Details are not described herein again.

In some embodiments, the ECS may determine, from the at least one local DNS server, a local DNS server that can provide the address of the instance of the first application. For specific content, refer to the descriptions in step 507. Details are not described herein again.

For details about a process in which the ECS obtains the address via the determined local DNS server, refer to step 907a and step 908a.

Step 907a: The ECS sends an EAS discovery request message to the local DNS server.

The EAS discovery request message includes the identifier of the first application, and is used to request the address of the instance of the first application. A source IP address of the EAS discovery request message is an IP address of the EES. The EAS discovery request message may also be replaced with a DNS query message, and details are not described herein again.

Step 908a: The local DNS server determines the address of the instance of the first application based on the EAS discovery request message, and sends the address of the instance of the first application to the ECS based on an EAS discovery response message.

In some embodiments, the ECS may obtain the address via a centralized DNS server. For details, refer to step 907b and step 908b.

Step 907b: The ECS sends an EAS discovery request message to the centralized DNS server.

The EAS discovery request message includes the identifier of the first application, and is used to request the address of the instance of the first application. A source IP address of the EAS discovery request message is an IP address of the EES. The EAS discovery request message may also be replaced with a DNS query message, and details are not described herein again.

Step 908b: The centralized DNS server determines the address of the instance of the first application based on the EAS discovery request message, and sends the address of the instance of the first application to the ECS based on an EAS discovery response message.

Step 909: After obtaining the address of the instance of the first application, the ECS sends the address of the instance of the first application to the NEF network element.

Step 910: After receiving the address of the instance of the first application, the NEF network element sends the address of the instance of the first application to the SMF network element.

Step 911: After receiving the address of the instance of the first application, the SMF network element sends the address of the instance of the first application to the terminal device.

For example, the SMF network element may send the address of the instance of the first application based on a DNS query response.

The DNS query response may be forwarded to the terminal device via a UPF network element and a RAN. A specific process is not described again.

Embodiments described in this specification may be independent solutions, or may be combined based on internal logic. All these solutions fall within the protection scope of this application.

In the foregoing embodiments provided in this application, the methods provided in embodiments of this application are separately described from a perspective of interaction between devices. To implement functions in the methods provided in embodiments of this application, the first network device and the third network device may include a hardware structure and/or a software module, to implement the foregoing functions in a form of the hardware structure, the software module, or a combination of the hardware structure and the software module. Whether a function in the foregoing functions is performed by using the hardware structure, the software module, or the combination of the hardware structure and the software module depends on particular applications and design constraints of the technical solutions.

In embodiments of this application, module division is an example, and is merely a logical function division. In some embodiments, another division manner may be used. In addition, functional modules in embodiments of this application may be integrated into one processor, or may exist alone physically, or two or more modules are integrated into one module. The integrated module may be implemented in a form of hardware, or may be implemented in a form of a software functional module.

Figure 10:
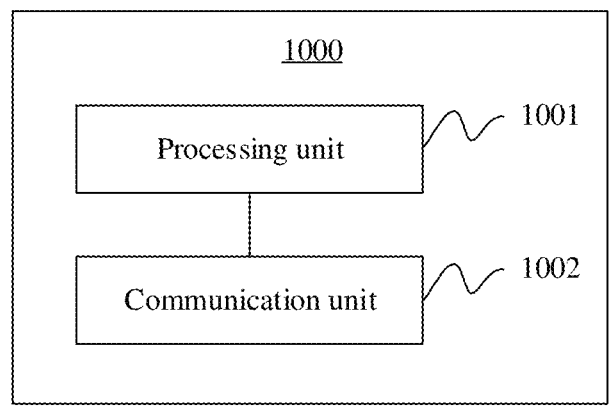
FIG. 10 is a schematic diagram of a structure of a communication apparatus according to an embodiment of this application.

Same as the foregoing concept, as shown in FIG. 10, an embodiment of this application further provides an apparatus 1000, configured to implement functions of the terminal device or the network device in the foregoing methods. For example, the apparatus may be a software module or a chip system. In embodiments of this application, the chip system may include a chip, or may include a chip and another discrete component. The apparatus 1000 may include a processing unit 1001 and a communication unit 1002.

In embodiments of this application, the communication unit may also be referred to as a transceiver unit, and may include a sending unit and/or a receiving unit.

Figure 11:
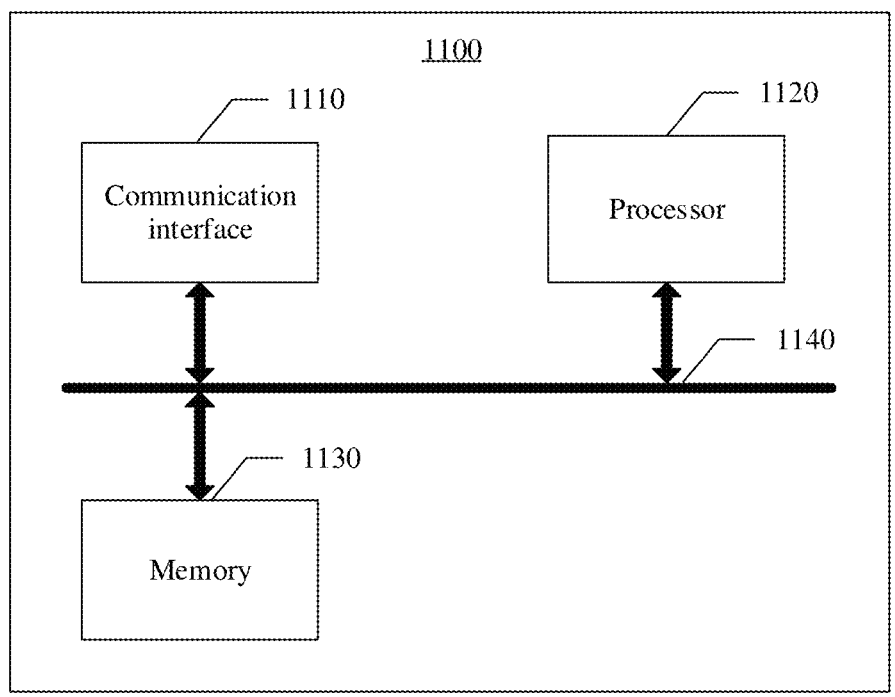
FIG. 11 is a schematic diagram of a structure of a communication apparatus according to an embodiment of this application.

The following describes in detail communication apparatuses provided in embodiments of this application with reference to FIG. 10 and FIG. 11. It should be understood that descriptions of apparatus embodiments correspond to the descriptions of the method embodiments. Therefore, for content that is not described in detail, refer to the foregoing method embodiments. For brevity, details are not described herein again.

In a possible design, the apparatus 1000 may implement steps or procedures performed by the first network device or the third network device in the foregoing method embodiments. The following separately provides descriptions.

For example, when the apparatus 1000 implements functions of the first network device in the procedure shown in FIG. 3,
  a communication unit 1002 is configured to: obtain registration information, where the registration information indicates that a second network device can provide an address of an instance of at least one application; and receive a first message from a third network device, where the first message includes an identifier of a first application, and is used to request an address of an instance of the first application; and
  a processing unit 1001 is configured to: when determining, based on the registration information and the identifier of the first application, to send a second message to the second network device, send the second message via the communication unit 1002, where the second message includes the identifier of the first application, and the second message is used to request the address of the instance of the first application, where
  the communication unit 1002 is configured to: receive the address of the instance of the first application from the second network device; and send the address of the instance of the first application to the third network device.

In some embodiments, the first message is an edge application server EAS discovery request message.

In some embodiments, the communication unit 1002 is specifically configured to:
  receive the registration information from the second network device; or
  obtain the registration information that is preconfigured in the first network device.

In some embodiments, the communication unit 1002 is further configured to:
  send the registration information to the third network device; or send indication information to the third network device, where the indication information indicates that the first network device can provide an address of an instance of at least one application, and the indication information is determined based on the registration information.

In some embodiments, the apparatus is an edge enabler server EES, the second network device is a local DNS server, and the third network device is a session management function SMF network element, an NEF network element, or an edge configuration server ECS; or
  the apparatus is an ECS, the second network device is a local DNS server, and the third network device is an SMF network element or an NEF network element.

In some embodiments, the processing unit 1001 is further configured to:
  determine, based on the registration information, that the second network device can provide the address of the instance of the first application.

In some embodiments, the registration information includes area information corresponding to the second network device, and the apparatus further includes:
  obtaining, by the first network device, location information of a terminal device; and
  determining, by the first network device based on the area information in the registration information and the location information of the terminal device, that the second network device can provide the address of the instance of the first application.

For example, when the apparatus 1000 implements functions of the third network device in the procedure shown in FIG. 3,
  the communication unit 1002 is configured to obtain an identifier of a first application from a terminal device, where the identifier of the first application indicates a request for obtaining an address of an instance of the first application; and
  the processing unit 1001 is configured to determine a first network device based on the identifier of the first application, where
  the communication unit 1002 is configured to: send a first message to the first network device, where the first message includes the identifier of the first application, and the first message is used to request the address of the instance of the first application; and receive the address of the instance of the first application from the first network device, and send the address of the instance of the first application to the terminal device.

In some embodiments, the communication unit 1002 is specifically configured to:
  receive registration information sent by the first network device, where the registration information indicates that a second network device can provide an address of an instance of at least one application; or receive indication information from the first network device, where the indication information indicates that the first network device can provide an address of an instance of at least one application, and the indication information is determined based on the registration information.

In some embodiments, the processing unit 1001 is specifically configured to:
determine, based on the registration information or the indication information, that the first network device can provide the address of the instance of the first application; and/or determine, based on the registration information, that the second network device can provide the address of the instance of the first application.

In some embodiments, the first message is an edge application server EAS discovery request message.

In some embodiments, the communication unit 1002 is specifically configured to: obtain a DNS query request from the terminal device, where the DNS query request includes the identifier of the first application, and the DNS query request is used to request the address of the instance of the first application.

In some embodiments, the apparatus is a session management function SMF network element, an NEF network element, or an edge configuration server ECS, and the first network device is an edge enabler server EES; or the apparatus is an SMF network element or an NEF network element, and the first network device is an ECS.

FIG. 11 shows an apparatus 1100 according to an embodiment of this application. The apparatus shown in FIG. 11 may be an embodiment of a hardware circuit of the apparatus shown in FIG. 10. For ease of description, FIG. 11 shows only main components of the communication apparatus.

The apparatus 1100 may further include at least one memory 1130, configured to store program instructions and/or data. The memory 1130 is coupled to a processor 1120. The coupling in embodiments of this application may be an indirect coupling or a communication connection between apparatuses, units, or modules in an electrical form, a mechanical form, or another form, and is used for information exchange between the apparatuses, the units, or the modules. The processor 1120 may operate with the memory 1130 collaboratively. The processor 1120 may execute the program instructions stored in the memory 1130. At least one of the at least one memory may be included in the processor.

The apparatus 1100 shown in FIG. 11 includes at least one processor 1120 and a communication interface 1110. The processor 1120 is configured to execute instructions or a program stored in the memory 1130. When the instructions or the program stored in the memory 1130 is executed, the processor 1120 is configured to perform an operation performed by the processing unit 1001 in the foregoing embodiment, and the communication interface 1110 is configured to perform an operation performed by the communication unit 1002 in the foregoing embodiment. For details, refer to the foregoing descriptions. Details are not described herein again.

In embodiments of this application, the communication interface may be a transceiver, a circuit, a bus, a module, or a communication interface of another type. In embodiments of this application, when the communication interface is the transceiver, the transceiver may include an independent receiver and an independent transmitter, or may be a transceiver integrated with a transceiver function or a communication interface.

The apparatus 1100 may further include a communication line 1140. The communication interface 1110, the processor 1120, and the memory 1130 may be connected to each other through the communication line 1140. The communication line 1140 may be a peripheral component interconnect (peripheral component interconnect, PCI for short) bus, an extended industry standard architecture (extended industry standard architecture, EISA for short) bus, or the like. The communication line 1140 may be classified into an address bus, a data bus, a control bus, and the like. For ease of representation, only one bold line is used to represent the communication line in FIG. 11, but this does not mean that there is only one communication line or only one type of communication line.

An embodiment of this application further provides a computer-readable storage medium. The computer-readable storage medium stores a computer program. When the program is executed by a processor, a procedure related to the first network device in the embodiment shown in FIG. 3 provided in the foregoing method embodiments may be implemented.

An embodiment of this application further provides a computer-readable storage medium. The computer-readable storage medium stores a computer program. When the program is executed by a processor, a procedure related to the third network device in the embodiment shown in FIG. 3 provided in the foregoing method embodiments may be implemented.

An embodiment of this application further provides a computer program product including instructions. When the instructions are executed, the method related to the first network device in the embodiment shown in FIG. 3 is performed.

An embodiment of this application further provides a computer program product including instructions. When the instructions are executed, the method related to the third network device in the embodiment shown in FIG. 3 is performed.

An embodiment of this application further provides a chip, including a processor. The processor is coupled to a memory, and is configured to execute a computer program or instructions stored in the memory. When executing the computer program or the instructions, the processor performs the method related to the first network device in the embodiment shown in FIG. 3.

An embodiment of this application further provides a chip, including a processor. The processor is coupled to a memory, and is configured to execute a computer program or instructions stored in the memory. When executing the computer program or the instructions, the processor performs the method related to the third network device in the embodiment shown in FIG. 3.

This application provides a system, including the first network device in the embodiment shown in FIG. 3 and the third network device in the embodiment shown in FIG. 3.

A person skilled in the art should understand that embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, an optical memory, and the like) that include computer-usable program code.

This application is described with reference to the flowcharts and/or block diagrams of the methods, the devices (systems), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

It is clear that, a person skilled in the art can make various modifications and variations to this application without departing from the scope of this application. This application is intended to cover these modifications and variations of this application provided that they fall within the scope of protection defined by the following claims and their equivalent technologies.

What is claimed is:

1. An address obtaining method, comprising:
    obtaining, by a first network device, registration information, wherein the registration information indicates that a second network device is configured to provide an address of an instance of at least one application;
    receiving, by the first network device, a first message from a third network device, wherein the first message comprises an identifier of a first application, and the first message is useable to request an address of an instance of the first application;
    sending, by the first network device, a second message to the second network device based on the registration information and the identifier of the first application, wherein the second message comprises the identifier of the first application, and the second message is useable to request the address of the instance of the first application;
    receiving, by the first network device, the address of the instance of the first application from the second network device; and
    sending, by the first network device, the address of the instance of the first application to the third network device.

2. The method according to claim 1, wherein the first message includes an edge application server (EAS) discovery request message.

3. The method according to claim 1, wherein the obtaining, by the first network device, registration information comprises:
    receiving, by the first network device, the registration information from the second network device; or
    obtaining, by the first network device, the registration information that is preconfigured in the first network device.

4. The method according to claim 1, further comprising:
    sending, by the first network device, the registration information to the third network device; or
    sending, by the first network device, indication information to the third network device, wherein the indication information indicates that the first network device is configured to provide the address of the instance of the at least one application, and the indication information is determined based on the registration information.

5. The method according to claim 1, wherein
    the first network device is an edge enabler server (EES), the second network device is a local domain name system (DNS) server, and the third network device is a session management function (SMF) network element, a network exposure function (NEF) network element, or an edge configuration server (ECS); or
    the first network device is the ECS, the second network device is the local DNS server, and the third network device is the SMF network element or the NEF network element.

6. An address obtaining method, comprising:
    obtaining, by a third network device, an identifier of a first application from a terminal device, wherein the identifier of the first application indicates a request for obtaining an address of an instance of the first application;
    sending, by the third network device, a first message to a first network device, wherein the first message comprises the identifier of the first application, and the first message is useable to request the address of the instance of the first application; and
    receiving, by the third network device, the address of the instance of the first application from the first network device, and sending the address of the instance of the first application to the terminal device.

7. The method according to claim 6, wherein further comprising:
    receiving, by the third network device, registration information from the first network device, wherein the registration information indicates that a second network device is configured to provide an address of an instance of at least one application; or
    receiving, by the third network device, indication information from the first network device, wherein the indication information indicates that the first network device is configured to provide the address of the instance of the at least one application, and the indication information is determined based on the registration information.

8. The method according to claim 7, wherein further comprising:
    determining, by the third network device and based on the registration information or the indication information, that the first network device is configured to provide the address of the instance of the first application; or
    determining, by the third network device and based on the registration information, that the second network device is configured to provide the address of the instance of the first application.

9. The method according to claim 6, wherein the first message includes an edge application server (EAS) discovery request message.

10. The method according to claim 6, wherein the obtaining, by the third network device, the identifier of the first application from the terminal device comprises:
    obtaining, by the third network device, a domain name system (DNS) query request from the terminal device, wherein the DNS query request comprises the identifier of the first application, and the DNS query request is useable to request the address of the instance of the first application.

11. An apparatus, comprising:
    at least one processor; and a non-transitory memory coupled to the at least one processor, and configured to store non-transitory instructions, and in response to being executed by the at least one processor, cause the apparatus to:

obtain registration information, wherein the registration information indicates that a second network device is configured to provide an address of an instance of at least one application;

receive a first message from a third network device, wherein the first message comprises an identifier of a first application, and the first message is useable to request an address of an instance of the first application;

send a second message to the second network device based on the registration information and the identifier of the first application, wherein the second message comprises the identifier of the first application, and the second message is useable to request the address of the instance of the first application;

receive the address of the instance of the first application from the second network device; and send the address of the instance of the first application to the third network device.

12. The apparatus according to claim 11, wherein the first message includes an edge application server (EAS) discovery request message.

13. The apparatus according to claim 11, wherein in response to being executed by the at least one processor, the non-transitory instructions, further cause the apparatus to:

receive the registration information from the second network device; or obtain the registration information that is preconfigured in the first network device.

14. The apparatus according to claim 11, wherein in response to being executed by the at least one processor, the non-transitory instructions, further cause the apparatus to:

send the registration information to the third network device; or send indication information to the third network device, wherein the indication information indicates that the apparatus is configured to provide the address of the instance of the at least one application, and the indication information is determined based on the registration information.

15. The apparatus according to claim 11, wherein the apparatus is an edge enabler server (EES), the second network device is a local domain name system (DNS) server, and the third network device is a session management function (SMF) network element, a network exposure function (NEF) network element, or an edge configuration server (ECS); or the apparatus is the ECS, the second network device is the local DNS server, and the third network device is the SMF network element or the NEF network element.

16. An apparatus, comprising:

at least one processor; and a non-transitory memory coupled to the at least one processor, and configured to store non-transitory instructions, and in response to being executed by the at least one processor, cause the apparatus to:

obtain an identifier of a first application from a terminal device, wherein the identifier of the first application indicates a request for obtaining an address of an instance of the first application;

send a first message to a first network device, wherein the first message comprises the identifier of the first application, and the first message is useable to request the address of the instance of the first application; and receive the address of the instance of the first application from the first network device, and send the address of the instance of the first application to the terminal device.

17. The apparatus according to claim 16, wherein in response to being executed by the at least one processor, the non-transitory instructions, further cause the apparatus to:

receive registration information from the first network device, wherein the registration information indicates that a second network device is configured to provide an address of an instance of at least one application; or receive indication information from the first network device, wherein the indication information indicates that the first network device is configured to provide the address of the instance of the at least one application, and the indication information is determined based on the registration information.

18. The apparatus according to claim 17, wherein in response to being executed by the at least one processor, the non-transitory instructions, further cause the apparatus to:

determine, based on the registration information or the indication information, that the first network device is configured to provide the address of the instance of the first application; or determine, based on the registration information, that the second network device is configured to provide the address of the instance of the first application.

19. The apparatus according to claim 16, wherein the first message includes an edge application server (EAS) discovery request message.

20. The apparatus according to claim 16, wherein in response to being executed by the at least one processor, the non-transitory instructions, further cause the apparatus to:

obtain a domain name system (DNS) query request from the terminal device, wherein the DNS query request comprises the identifier of the first application, and the DNS query request is useable to request the address of the instance of the first application.

* * * * *